United States Patent
Cohen

(10) Patent No.: US 8,130,758 B2
(45) Date of Patent: Mar. 6, 2012

(54) SYSTEM AND METHOD FOR LOW LATENCY MARKET DATA

(75) Inventor: David Cohen, Ridgewood, NJ (US)

(73) Assignee: Bank of America Corporation, Charlotte, NC (US)

( * ) Notice: Subject to any disclaimer, the term of this patent is extended or adjusted under 35 U.S.C. 154(b) by 743 days.

(21) Appl. No.: 11/410,536

(22) Filed: Apr. 24, 2006

(65) Prior Publication Data

US 2007/0025351 A1 Feb. 1, 2007

Related U.S. Application Data

(60) Provisional application No. 60/694,541, filed on Jun. 27, 2005.

(51) Int. Cl.
*H04L 12/28* (2006.01)

(52) U.S. Cl. .......................... 370/392; 709/246; 370/403

(58) Field of Classification Search .................. 370/403, 370/442; 725/110, 114; 709/246
See application file for complete search history.

(56) References Cited

U.S. PATENT DOCUMENTS

| | | | |
|---|---|---|---|
| 5,003,473 A | 3/1991 | Richards | |
| 5,270,922 A | 12/1993 | Higgins | |
| 5,893,091 A | 4/1999 | Hunt et al. | |
| 6,055,571 A | 4/2000 | Fulp et al. | |
| 6,058,378 A | 5/2000 | Clark et al. | |
| 6,278,982 B1 | 8/2001 | Korhammer et al. | |
| 6,781,972 B1 * | 8/2004 | Anderlind et al. | 370/329 |
| 7,082,410 B1 | 7/2006 | Anaya et al. | |
| 7,310,349 B2 * | 12/2007 | Beshai | 370/428 |
| 7,400,637 B1 * | 7/2008 | Chapman | 370/403 |
| 2001/0044770 A1 | 11/2001 | Keith | |
| 2002/0059078 A1 | 5/2002 | Valdes et al. | |
| 2002/0091624 A1 | 7/2002 | Glodjo et al. | |
| 2003/0061365 A1 * | 3/2003 | White et al. | 709/229 |
| 2003/0061385 A1 * | 3/2003 | Gonze | 709/246 |
| 2003/0149653 A1 | 8/2003 | Penney et al. | |
| 2005/0283421 A1 * | 12/2005 | Hatheway et al. | 705/37 |
| 2005/0283457 A1 * | 12/2005 | Sonkin et al. | 707/1 |
| 2006/0212333 A1 | 9/2006 | Jackson | |

OTHER PUBLICATIONS

"Accessing a [My SQL] Database from R," http://stat-www.berkeley.edu/users/nolan/stat133/Fall04/lectures/SQL-R.pdf, 2004, 4 pages.
Adler et al., "A Framework for an R to OpenGL Interface for Interactive 3D Graphics," Proceedings of the 3$^{rd}$ Intl. Workshop on Distributed Statistical Computing (DSC 2003), Internet: http://wsopuppenkiste.wiso.uni-goettingen.de/~dadler/publications/dsc03_RGL.pdf, 2003, 9 pages.

(Continued)

*Primary Examiner* — Robert Wilson
*Assistant Examiner* — Wei Zhao
(74) *Attorney, Agent, or Firm* — Michael A. Springs

(57) ABSTRACT

A method for low latency data comprises receiving a data stream comprising data from a data source, receiving the data via one or more queues, where each of the one or more queues is associated with one or more filters adapted to filter the data based at least upon a time predicate to create filtered data. Each of the one or more filters is established by one or more subscribers. The method also comprises receiving a portion of the filtered data that was filtered by a filter established by a particular one or more subscribers, and publishing the portion of the filtered data for the particular one or more subscribers.

73 Claims, 27 Drawing Sheets

OTHER PUBLICATIONS

Adler et al., "GGL: A R-Library for 3D Visualization with OpenGL," Internet: http://wsopuppenkiste.wiso.uni-goettingen.de/~dadler/rgl/, downloaded Jan. 10, 2007; 11 pages.

"An Example of a Server Placing a Call Back to a Client," Internet: http://ou800doc.caldera.com/en/SDA_netapi/rpcpC.callback.html, 2004 The SCO Group, Inc., downloaded Jan. 10, 2007, 4 pages.

Arora et al., "Web Services for Management (WS-Management)", Advanced Micro Devices, Dell, Inc., Intel Corp., Microsoft Corp., and Sun Microsystems, Internet: http://msdn.microsoft.com/library/en-us/dnglobspec/html/ws-management.pdf, Oct. 2004, 23 pages.

"Asd: an Asynchronous Sensor Daemon for PlanetLab," Internet: http://berkeley.intel-research.net/troscoe/asd/, downloaded Jan. 9, 2007, 2 pages.

Balazinska et al., "Contract-Based Load Management in Federated Distributed Systems," MIT Computer Sci. and Artificial Intelligence Lab, Internet: http://nms.lcs.mit.edu/projects/medusa, 14 pages.

Bellman, Richard, "On an Application of Dynamic Programming to the Synthesis of Logical Systems," Feb. 1959, pp. 486-493.

"The Boost Graph Libraries," Boost C++ Libraries, Internet: http://www.boost.org/libs/graph.doc, downloaded Jan. 11, 2007, 4 pages.

Brett et al., "A Shared Global Event Propagation System to Enable Next-Generation Distributed Services", Intel Labs, Intel Corp., Internet: http://usenix.org/events/worlds04/tech/full_papers/brett/brett.pdf, 2004, 9 pages.

Buyya, Rajkumar et al., ExcelGrid: A .NET Plug-In for Outsourcing Excel Spreadsheet Workload to Enterprise and Global Grids, Dept. of CS and SE, Univ. of Melbourne, Australia, Internet: http://www.gridbus.org/papers/eg.pdf, 2004, 13 pages.

Christian et al., Panda: An Implementation of Generative Communication on a Structured Peer-to-Peer Overlay, Rice University, Dec. 9, 2004, pp. 1-11.

Chun et al., "Design Considerations for Information Planes," Intel Research at Berkeley, Internet: http://www.usenix.org/events/worlds04/tech/full_papers/chun/chun.pdf, 2004, pp. 1-6.

"Common Information Model (CIM) Standards," Distributed Management Task Force, Inc., Internet: http://www.dmtf.org/standards/cim/, downloaded Jan. 11, 2007, 2 pages.

"Communications Programming Concepts: RPC Callback Procedures Example," Internet: http://publib16.boulder.ibm.com/doc_link/en_US/a_doc_lib/aixprggd/progcomc/rpc_callback_ex.htm, downloaded Jan. 10, 2007, 4 pages.

Cornell, Paul, "Building a Real-Time Data Server in Excel 2002," Internet: http://msdn.microsoft.com/Library/en-us/dnexcl2k2/html/odc_xlrtdfaq.asp, downloaded Jan. 9, 2007, Jul. 2001, 10 pages.

Cornell, Paul, "Real-Time Data: Frequently Asked Questions," Internet: http://msdn2.microsoft.com/en-us/library/aa140060(office.10,d=printer).aspx, downloaded Jan. 9, 2007, Jul. 2001, 9 pages.

Dabek et al., "Practical, Distributed Network Coordinates," Internet: http://pdos.csail.mit.edu/papers/hotnets:vivaldi/paper.pdf, 2003, 6 pages.

Database Access and Integration Services WG (DAIS-WG), Internet: http://forge.gridforum.org/projects/dais-wg, downloaded Jan. 10, 2007, 2 pages.

"Distributed Queue Adaptor," PBGL, Internet: http://www.osl.iu.edu/research/pbgl/documentation/graph/distributed_queue.html, downloaded Jan. 11, 2007, 3 pages.

"Distributed Service Management Toolkit," Intel Corp., Internet: http://www.dsmt.org/?print=1, 2005, downloaded Jan. 11, 2007, 1 page.

"DQUOB (Dynamic QUery OBjects, pronounced d'quob)," continuous evaluation of queries over time—series data, Internet: http://www.cs.indiana.edu/~plale/projects/dQUOB, downloaded Jan. 8, 2007, 2 pages.

"Everyday Datatypes," MPI Tutorial, Internet: http://www.lam-mpi.org/tutorials/one-step/datatypes.php, Mar. 8, 2006, 4 pages.

Galertner et al., "How to Write Parallel Programs: A Guide to the Perplexed," Dept. of Computer Science, Yale University, ACM Computing Surveys, vol. 21, No. 3, Sep. 1989, pp. 323-357.

"Ganglia"—a scalable distributed monitoring system, Internet: http://ganglia.sourceforge.net, posted Dec. 25, 2006 by knobi, Ganglia 3.0.4 released, downloaded Jan. 10, 2007, 17 pages.

Gentleman, Robert, "R : A Computer Language for Statistical Data Analysis," Internet: https://svn.r-project.org/R/trunk/src/modules/internet/sock.c, © 1998-2001, downloaded Jan. 11, 2007, 5 pages.

Gentleman, Robert, "R : A Computer Language for Statistical Data Analysis," Internet: https://svn.r-project.org/R/trunk/src/modules/internet/sock.h, © 1998-2006, downloaded Jan. 11, 2007, 2 pages.

Goldszmidt et al, "Continuous Value Function Approximation for Sequential Bidding Policies," Internet: http://www.cs.toronto.edu/~cebly/Papers/_download_/Contauct.ps, 1999, 10 pages.

Goldszmidt et al., "Correlating Instrumentation Data to System States: A Building Block for Automated Diagnosis and Control," Internet Systems and Storage Laboratory, Internet: http://www.hpl.hp.com/techreports/2004/HPL-2004-183.pdf, Oct. 19, 2004, 15 pages.

Graham et al., "Publish-Subscribe Notification for Web Services," Version 1.0, Internet: http://www.106.ibm.com/developerworks/library/ws-pubsub/, Mar. 5, 2004, 19 pages.

"GT 4.0 Data Management," Globus, Internet: http://www.globus.org/toolkit/docs/4.0/data/, downloaded Jan. 10, 2007, 1 page.

"GT 4.0 Information Services," Globus, Internet: http://ww.globus.org/toolkit/docs/4.0/info/, downloaded Jan. 11, 2007, 1 page.

"GT 4.0 Tech Review: OGSA-DAI," WSRF Capabilities, with release notes, Internet: http://www.globus.org/toolkit/docs/4.0/techpreview/osadai/, ... /data/key, ... release_notes, and admin-index.html, downloaded Jan. 11, 2007, 39 pages.

Gudgin et al., "SOAP Message Transmission Optimization Mechanism," W3C Recommendation Jan. 25, 2005; Internet: http://www.s3.org/TR/soap12-mtom/, downloaded Jan. 9, 2007, 15 pages.

Holland, John H., "A Derived Markov Process for Modeling Reaction Networks," Dept. of EECS and Dept. of Psychology, Internet: http://mitpress.mit.edu/journals/pdf/evco_11_4_339_0.pdf, 2003, pp. 339-362.

Hapner et al., "Java Message Service," specification v1.1, Sun Microsystems, Internet: http://java.sun.com/Products/jms/docs.html, Apr. 12, 2002, 140 pages.

"IRtdServer Interface," Excel Primary Interop Assembly Reference, msdn, Internet: http://msdn.microsoft.com/library/en-us/vbax111/html/xlobjIRtdServer_HV03085058.asp, 2007, 2 pages.

"IRTDUpdateEvent Interface," Excel Primary Interop Assembly Reference, msdn, Internet: http://msdn.microsoft.com/library/en-us/vbax111/html/xlobjIRTDUpdateEvent_HV03088494.asp, 2007, 2 pages.

"Java Servlet Technology Documentation," Internet: http://java.sun.com/products/servlet/docs.html, downloaded Jan. 10, 2007, 2 pages.

Kearns et al., "Electronic Trading in Order-Driven Markets: Efficient Execution," Internet: http://www.cis.upenn.edu/~mkearns/papers/optexec.pdf, 2005, 8 pages.

Kearns et al, "Fast Planning in Stochastic Games," Internet: http://www.cis.upenn.edu/~mkearns/paperssparesegame.pdf, 1999, 8 pages.

Kearns et al., "Trading in Markovian Price Models," Dept. of Computer and Information Sciences, University of PA, Internet: http://www.cis.upenn.edu/~mkearns/papers/pricemodel.pdf, 2005, pp. 1-15.

Koenker et al., "Statistical Analysis of Large Datasets: An Exploration of R—MySQL Interface," Internet: http://www.econ.uiuc.edu/_roger/research/rq/LM.html, downloaded Jan. 10, 2007, Dec. 25, 2000, 6 pages.

Licklider, J.C.R., "Man-Computer Symbiosis," IRE Transactions on Human Factors in Electronics, vol. HFE-1, Mar. 1960, pp. 4-11, Internet: http://groups.csail.mit.edu/medg/people/psz/Licklider.html, downloaded Jan. 9, 2007, 12 pages.

Lipson et al., "Survivability—A New Technical and Business Perspective on Security," CERT Coordination Center, Pittsburgh, PA, 2000, Internet: http://www.cert.org/archive/pdf/busperpec.pdf, 7 pages.

Mandlebrot et al., "The (Mis)Behaviors of Markets: A Fractal view of Risk, Ruin, and Reward," Pub. by Basic Books, A Member of the Perseus Books Group, New York, NY (hardcover book), © 2004, 328 pages.

Massie, Matt, "SexyRPC," Internet: http://sexyrpc.sourceforge.net, downloaded Jan. 11, 2007, 2003, 17 pages.
"Models of Computation References," Internet: http://wiki.squeak.org/squeak/3768, downloaded Jan. 10, 2007, 3 pages.
"My SQL Cluster Overview," MySQL 5.0 Reference Manual, 15.1; Internet: http://dev.mysql.com/doc/refman/5.0/en/mysql-cluster-overview.html, downloaded Jan. 11, 2007, 2 pages.
Nagios—a host, service and network monitoring program, Internet: http://www.nagios.org, downloaded Jan. 11, 2007, 2 pages.
Norlander et al., "Programming with Time-Constrained Reactions," Internet: http://www.cse.ogi.edu/pacsoft/projects/Timber/timed.pdf, 2003, 11 pages.
"OGSA-DAI Project," The Open Grid Services Architecture Data Access and Integration, Internet: http://www.ogsadai.org.uk/, downloaded Jan. 11, 2007, Univ. of Edinburg, 2006, 63 pages.
Oppenheimer et al., "Distributed Resource Discovery on PlanetLab with SWORD," Internet: http://www.cs.berkeley.edu/~davidopp/pubs/worlds04.pdf, 2004, 5 pages.
"The Parallel Boost Graph Library," Internet: http://www.osl.iu.edu/research/pbgl/, downloaded Jan. 11, 2007, 1 page.
Plale, Beth, "Architecture for Accessing Data Streams on the Grid," CS Dept., Indiana Univ., 2004, Internet: http://www.cs.indiana.edu/~plale/documents/AxGrid04.pdf, 10 pages.
Plale, Beth, "On When Data Streams Can (and Should) be Considered a Data Resource," CS Dept., Indiana University, Internet: http://www.cs.indiana.edu/~plale/documents/DAISstreams.pdf, Oct. 2003, 9 pages.
"PlanetLab PsEPR Server," Planetary Scale Event Propagation and Routing, Internet: http://psepr.org/, downloaded Jan. 11, 2007, 2 pages.
"Ptolemy II," a tool for concurrent modeling and design, Internet: http://ptolemy.eecs.berkeley.edu/ptolemyII/main.htm, downloaded Jan. 10, 2007, 9 pages.
"R Data Import/Export," Internet: http://cran.r-project.org/doc/manuals/R-data.html, downloaded Jan. 10, 2007, 33 pages.
"RMySQL: R Interface to the MySQL Database," Internet: http://cran.r-project.org/src/contrib/Descriptions/RMySQL.html, downloaded Jan. 10, 2007, 1 page.
Roscoe et al., "A Simple Common Sensor Interface for PlanetLab," Internet: http://www.planet-lab.org/PDN/PDN-03-010/pdn-03-010.pdf, Mar./May 2003, 12 pages.
Rowstron et al., "Debunking Some Myths About Structured and Unstructured Overlays," Microsoft Research, Internet: http://www.research.microsoft.com/~antr/MS/myths.pdf, 2005, 14 pages.
"RPC.guide/Callback_Procedures," Internet: http://www.acc.umu.se/~balp/rpcunix/callback_procedures.html, downloaded Jan. 10, 2007, 4 pages.
"RPCserver.h Classes," Internet: http://www.gb.nrao.edu/GBT/MC/ygor/libraries/RPC++/RPCServer.h downloaded Jan. 10, 2007, 4 pages.
"The R Project for Statistical Computing," Internet: http://www.r-project.org/main.shtml, downloaded Jan. 26, 2007, 1 page.
"Rpvm: R Interface to PVM (Parallel Virtual Machine)," Internet: http://cran.r-project.org/src/contrib/Descriptions/rpvm.html, downloaded Jan. 10, 2007, 1 page.
"RSQLite: SQLite Interface for R," Internet: http://cran.r-project.org/src/contrib/Descriptions/RSQLite.html, downloaded Jan. 10, 2007, 1 page.
Sawyer, J., "Building Excel Real-Time Data Components in Visual Basic.NET," Microsoft Excel 2002 Technical Articles, Internet: http://msdn2.microsoft.com/en-us/library/aa140061(office.10,d=printer).aspx, 2001, downloaded Jan. 9, 2007, 10 pages.
Selfridge, Dr. O.G., "Pandemonium: A Paradigm for Learning," Session 3, Paper 6, 1959, pp. 511-527.
"Sexp—(S-expressions)," Internet: http://theory.lcs.mit.edu/~rivest/sexp.html, downloaded Jan. 11, 2007, 1 page.
"Sfexp: the small, fast s-expression library," Internet: http://sexpr.sourceforge.net/, downloaded Jan. 11, 2007, ver. 1.1, 2006, 8 pages.
Shannon, Claude E., "A Mathematical Theory of Communication," Reprinted with permission from The Bell System Technical Journal, vol. 27, pp. 379-423, 623-656, Jul., Oct. 1948, 54 pages.
Shasha et al., "Fast Approaches to Simple Problems in Financial time Series Streams," 2003, Internet: http://www.research.att.com/conf/mpds2003/schedule/zhuS.pdf, downloaded Jan. 11, 2007, 2 pages.
Shasha et al., "FinTime—a Financial Time Series Benchmark," Internet: http://www.cs.nyu.edu/cs/faculty/Shasha/fintime.d/bench.html, 2003, 7 pages.
Shasha et al., "The Virtues and Challenges of Ad Hoc + Streams Querying in Finance," Internet: http://sites.computer.org/debull/A03MAR-CD.pdf, 2003, pp. 49-56.
"Snow: Simple Network of Workstations," Internet: http://cran.r-project.org/src/contrib/Descriptions/snow.html, downloaded Jan. 10, 2007, 1 page.
"SOAP Message Transmission Optimization Mechanism," Internet: http://www.w3.org/TR/soap12-mtom/downloaded Jan. 9, 2007, 15 pages.
Srinivasan, R., "XDR: External Data Representation Standard," Internet: http://www.ietf.org/rfc/rfc1832.txt, downloaded Jan. 11, 2007, 23 pages.
"Supermon: High Performance Cluster Monitoring," Internet: http://www.supermon.sourceforge.net/, downloaded Jan. 11, 2007, 1 page.
"SWORD on PlanetLab: Scalable Wide-Area Resource Discovery," Internet: http://www.cs.berkeley.edu/~davidopp/sword/, downloaded Jan. 11, 2007, 2 pages.
Tassey, Gregory, Ph.D., "The Economic Impacts of Inadequate Infrastructure for Software Testing," manual, Internet: http://nist.gov/director/prog-ofc/report02-3.pdf, U.S. Dept. of Commerce, May 2002, 300 pages.
"TinyDB: A Declarative Query System for Motes," Sep. 2002, Internet: http://telegraph.cs.berkeley.edu/tinydb/tutorial/tinydb.html, dowloaded Jan. 11, 2007, 10 pages.
Wang et al., "Building a Tuple Space on Structure Peer-to-Peer Networks," Dept. of CS, Natl. Tsing Hua Univ., Internet: http://hpc.csie.thu.edu.tw/cthpc2005/pdf/I_5.pdf, 2005, 9 pages.
"Web Services Base Notification 1.2 (WS-BaseNotification)", OASIS Open 2004, Working Draft 03, In.ternet: ftp://www6.software.ibm.com/software/developer/library/ws-notification/WS-BaseN.pdf, Jun. 2004, 44 pages.
Welsh, Matt, "The Staged Event-Driven Architecture (SEDA) for Highly-Concurrent Server Applications," CS Division, UC Berkeley, Internet: http://www.eecs.harvard.edu/~mdw/proj/seda/, 20 pages.
Wiener, Norbert, "Cybernetics," (hardcover book), M.I.T. Press, © 1949, $2^{nd}$ Ed., 1961, 212 pages.
"Writing R Extensions," Version 2.4.1 (Dec. 18, 2006), R Development Core Team, Internet: http://cran.r-project.org/doc/manuals/R-exts.html, downloaded Jan. 11, 2007, 118 pages.
"The WS-Resource Framework," Internet: http://www.globus.org/wsrf/, downloaded Jan. 11, 2007, 3 pages.

* cited by examiner

| Hardware Requirements | HP Cluster Platform 4000 | IBM eServer 1350 Cluster |
|---|---|---|
| 1. 2-way, Opteron64 | 1u- dl145<br>Blade- bl35p | 1u- e326<br>Blade- HS20 |
| 2. Diskless Boot | Yes | Yes |
| 3. 4x Infiniband with IP/IB Gateway | Yes, not supported in blade form factor | Yes, not supported in blade form factor |
| 4. Cluster File System | Yes | Yes |

FIG. 9

| Design Pattern | Description |
|---|---|
| 1. Farmer / Worker | Applications where the work can be divided among multiple jobs with identical programs, but with a different value of certain parameters (e.g., an index). A single program is replicated and brought into execution through multiple identical processes, each of which are assigned a piece of the work by a farmer process. |
| 2. Data Parallelism | A subdivision of all relevant data structures is made. Then, each structure is allocated to a process. Assignment and computation are performed within the process. |
| 3. Functional / Task Parallelism | The basic computational blocks are functions acting on arguments and providing output to other functions. Arguments can be scalar values or complete structures, such as arrays. There are two models: (1) data driven execution, and (2) demand driven execution. In data driven execution, a function is executed as soon as all its input arguments are available. In demand driven execution, a function is executed only if its output argument is needed as input in a subsequent function. |

FIG. 10

This registers a long running query that will be invoked every time the NASDAQ table is published:

```
task::ctor()
{
        drv <- dbDriver("DAIS)
        con <- dbConnect(drv" MarketData.ML.Coth)
        res <- dbSendQuery(con
                    "SELECT * from NASDAQ
                        WHERE SYMBOL IN{INTC,'MACR,'MSFT}",
                    &callback)
}
```

This callback will be invoked every time the NASDAQ table is published:

```
task::callback(tableresultset)
{
        <apply math toresultset here>
}
```

FIG. 17

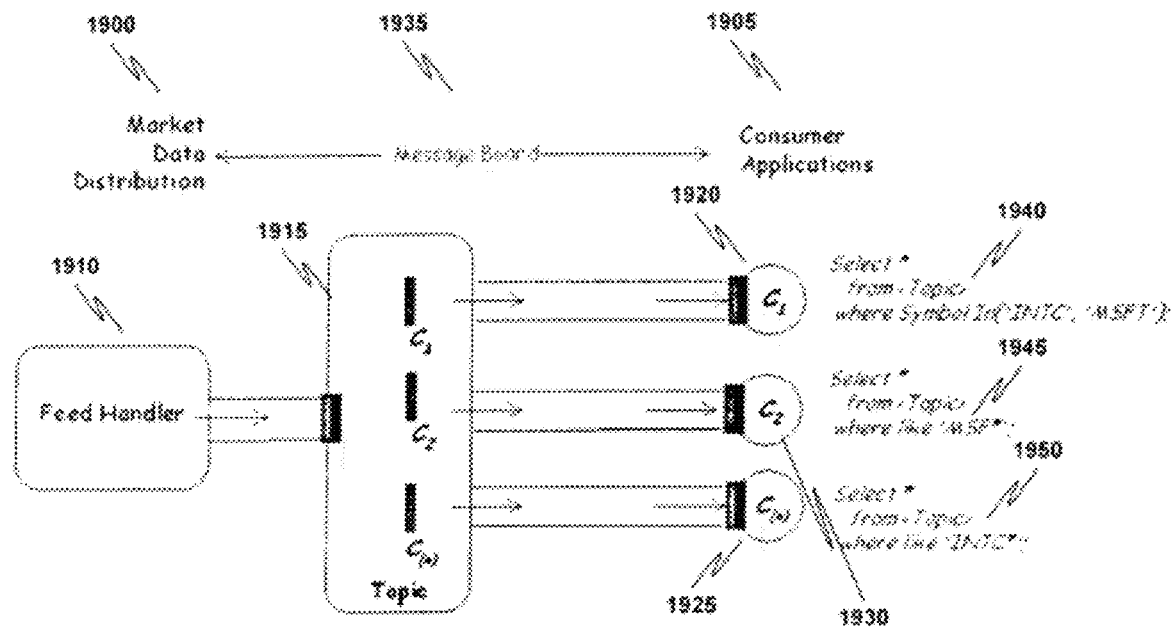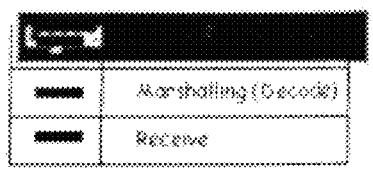
FIG. 19

SYSTEM AND METHOD FOR LOW LATENCY MARKET DATA

CROSS REFERENCE TO RELATED APPLICATIONS

This application claims the benefit of provisional patent application no. 60/694,541 filed Jun. 27, 2005, entitled "System and Method for Low Latency Market Data".

FIELD OF THE INVENTION

The present invention relates to the field of computer science. More particularly, the present invention relates to a system and method for low latency data.

BACKGROUND OF THE INVENTION

There are over 50,000 securities trading in the United States. Every second, up to 100,000 quotes and trades are generated. As shown in FIG. 1, most of the quotes and trades occur soon after trading begins (100), and before the close of trading (105). These quotes and trades are then distributed to a variety of organizations within the financial services industry.

FIG. 2 is a flow diagram that illustrates a system for market data distribution. This distribution mechanism can be viewed as a continuous data stream of quotes (bids and asks) (200) delivered by a feed handler 235 to multiple consumer applications (205, 210, 215), where each consumer application includes logic to receive the data stream containing encapsulated data (220), decode the data stream (225), and filter the contents of the data stream (230). In this model, market data is viewed as a monotonic stream of time-series data. This data stream 200 is treated as a distributed data resource similar to a relational database table. The data stream 200 may be expressed in terms of its logical data model (i.e. the data layout or structure of the stream 200). The stream 200 itself is named based on a partitioning scheme and represented as a Universal Resource Identifier (URI).

FIG. 3 is a detailed flow diagram that illustrates a system for market data distribution. FIG. 3 provides more detail for FIG. 2. As shown in FIG. 3, a feed handler 310 receives encapsulated market data from a data source 300 via a first network 308. Network stack 305 de-encapsulates the market data for use by the feed handler 310. A publisher 315 publishes the market data to a second network 325, using network stack 320 to encapsulate the published market data according to a network protocol. Each of multiple consumers (335, 345, 355, 360, 375, 385, 395, 398) is associated with a network stack for de-encapsulating the encapsulated published market data. Each of the multiple consumers (335, 345, 355, 360, 375, 385, 395, 398) also includes logic to filter the de-encapsulated published market data and further process the published market data that passes the filter.

Consumers of the data streams described above benefit from being able to receive and process the data streams as fast as possible. In "programmatic" trading applications, this means that there is an economic advantage in receiving the data in real-time. In this context, the term "real-time" means as close to zero-latency as possible. In these scenarios, the value of quote/trade data increases as the time it takes to be delivered from its source to its destination decreases.

Latency is introduced in networks in many ways. Since the speed of communications is ultimately limited by the speed of light, the physical distance that a message must travel affects latency. Also, any processing done on the message affects latency. Such processing may be performed by, for example, switches, routers, firewalls, etc. Processing done at the message source and the message destination hosts also affects latency. This processing includes protocol overhead and transmission time, buffer copies, context switches, and synchronization.

Traditional reflective methods for data distribution typically consume data, apply some process, and then trigger an action. Such methods require that potential candidates for input into the process must be delivered before the process can begin. Thus, the process can be viewed as discontinuous and discrete.

Internet Protocol (IP) Multicast is designed to provide support for wide area distribution of streaming data. Originally designed for delivery of video streams over the Internet, the technology has been widely applied in a diverse set of industries, including Energy, Financial Services, etc. Within the financial services industry specifically, use of IP multicast for the distribution of pricing data being published out of a variety of markets is pervasive. This has been driven primarily by the need to deliver this data to individual desktops where end users use it as input to a variety of analytical models running in a spreadsheet. Recently, a confluence of trends has started to erode the value of this approach. Driven by price/performance considerations, many automated analytical and trading applications that have traditionally run on a Sun/SPARC computer platform have started to migrate to an Intel/AMD computer platform. The scale-out model inherent in this architecture lends itself to parallelism achieved by fanning out the distribution of tasks, not data, across many systems. IP Multicast, in contrast, distributes the same data to every "listener" on the channel. Filtering this data requires some type of intermediate, in-line content inspection mechanism.

Stochastic methods for data distribution have been gaining in popularity. In stochastic methods, the process is continuous with portions of the requisite computation migrating towards the source of the data. These applications are simple queries that are applied against a known data model. Such applications represent a form of communication where software agents such as a long running Monte Carlo simulation hosted on a distributed, HPC cluster or interactive spreadsheets, interact with a dynamic, "live" system. This type of communication allows for evolutionary control within time-critical environments.

Beowulf is a concept of clustering commodity computers to form a parallel, virtual supercomputer. The communications subsystem is the clustering technology that harnesses the computing power of a collection of computer systems and transforms them into a high-performance cluster. The combination of the physical interconnection, the communications protocol, and the message passing interface comprises the communications subsystem. It allows the processes of a parallel application to exchange messages during their collaborative execution.

Current networking is based on Ethernet and Wide-Area/Internet distribution assumptions. These assumptions include that consumers of data are spread over large areas, and are characterized by open loop control. Cluster-based computing, characterized by high-density servers and message passing, invalidates many of these Ethernet and Wide-Area assumptions. This is because in cluster-based computing, consumers of data are centralized and located near the data source and are characterized by closed loop control.

Accordingly, a need exists in the art for solution that provides relatively less latency and relatively high throughput access to data. A further need exists for such a solution that provides access to market data. A further need exists for such a solution that provides a utility execution environment for access to "tick" data. Yet a further need exists for such a solution that facilitates relatively fast turnaround for analytical programs that consume the data.

SUMMARY OF THE INVENTION

A method for low latency data comprises receiving a data stream comprising data from a data source, receiving the data via one or more queues, where each of the one or more queues is associated with one or more filters adapted to filter the data based at least upon a time predicate to create filtered data. Each of the one or more filters is established by one or more subscribers. The method also comprises receiving a portion of the filtered data that was filtered by a filter established by a particular one or more subscribers, and publishing the portion of the filtered data for the particular one or more subscribers.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 9 is a table summarizing features of the cluster computing systems suitable for implementing aspects of the present invention.

FIG. 10 is a table summarizing various forms of parallel programming suitable for implementing aspects of the present invention.

FIG. 17 is a code sample that illustrates a callback mechanism in accordance with one embodiment of the present invention.

FIG. 19 is a block diagram that illustrates a system for low latency market data in accordance with one embodiment of the present invention.

DETAILED DESCRIPTION

Figure 1:
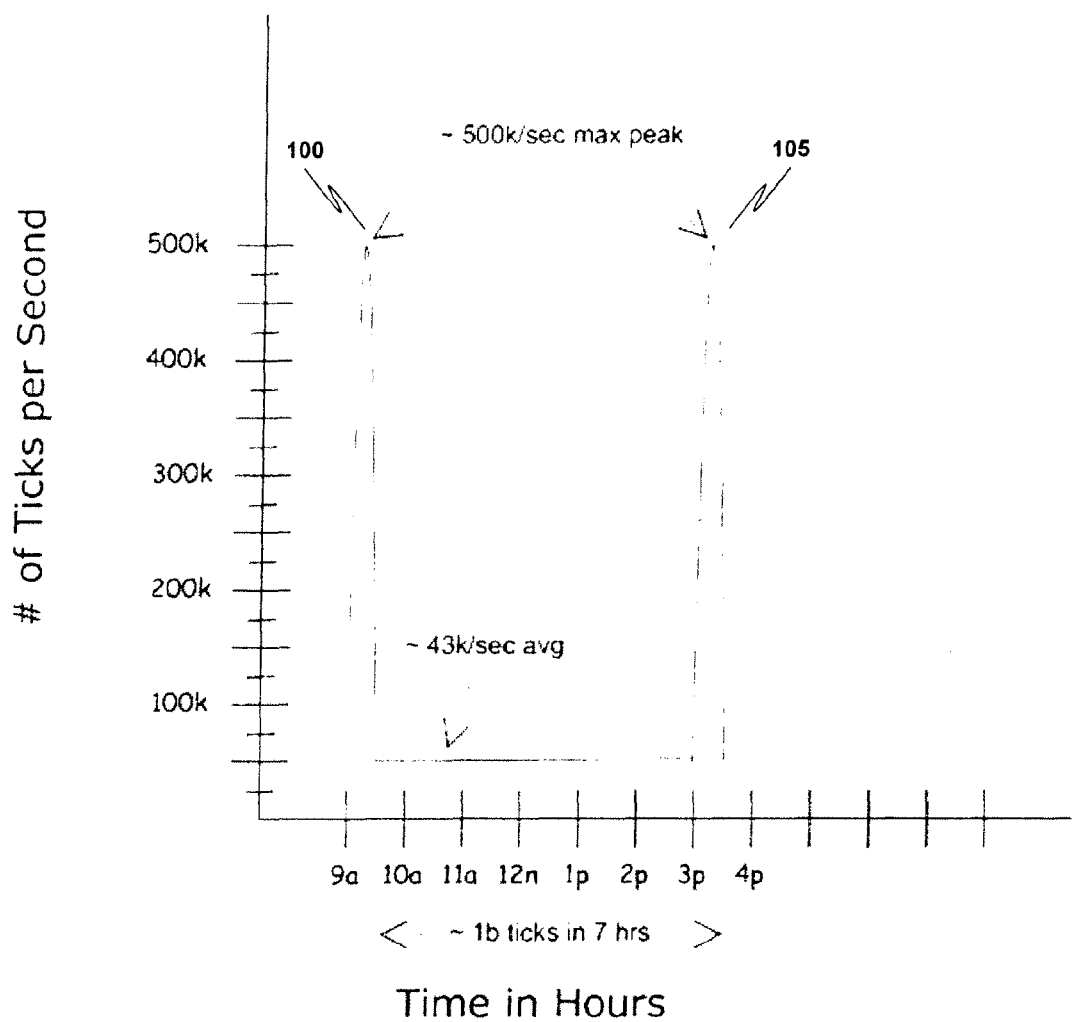
FIG. 1 is a graph that illustrates the relationship between number of ticks per second and the time of day.

Embodiments of the present invention are described herein in the context of a system and method for low latency data. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), comprising field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows®2000, available from Microsoft Corporation of Redmond, Wash., or various versions of the Unix operating system such as Linux available from a number of vendors. The method may also be implemented on a mobile device running an OS such as Windows® CE, available from Microsoft Corporation of Redmond, Wash., Symbian OS™, available from Symbian Ltd of London, UK, Palm OS®, available from PalmSource, Inc. of Sunnyvale, Calif., and various embedded Linux operating systems. Embedded Linux operating systems are available from vendors including MontaVista Software, Inc. of Sunnyvale, Calif., and FSMLabs, Inc. of Socorro, N.Mex. The method may also be implemented on a multiple-processor system, or in a computing environment comprising various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" comprises local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "identifier" describes one or more numbers, characters, symbols, or the like. More generally, an "identifier" describes any entity that can be represented by one or more bits.

In the context of the present invention, the term "financial instrument" describes an instrument that represents equity, debt, currency/foreign exchange, and commodities as well as their derivatives. An instrument is traded in the markets.

In the context of the present invention, the term "watchlist" describes a list of instruments being monitored by a particular entity.

In the context of the present invention, the term "chain" describes an instrument plus any related derivatives. Watchlists and chains are both examples of a more general notion of "Grouping," which refers to a container mechanism representing a list of instruments. Portfolios and indexes are additional examples of this grouping mechanism.

Figure 4:
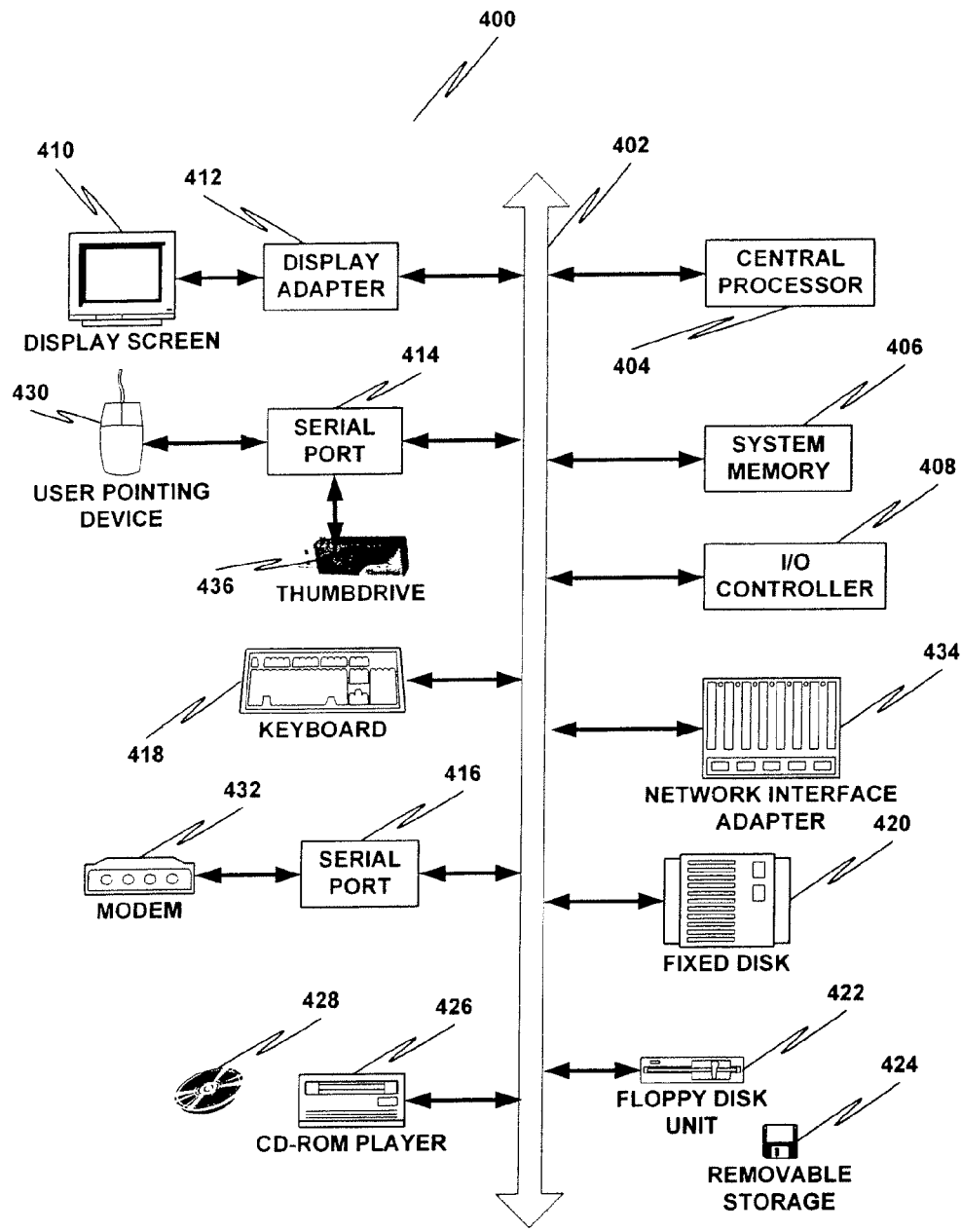
FIG. 4 is a block diagram of a computer system suitable for implementing aspects of the present invention.

FIG. 4 depicts a block diagram of a computer system 400 suitable for implementing aspects of the present invention. As shown in FIG. 4, computer system 400 comprises a bus 402 which interconnects major subsystems such as a central processor 404, a system memory 406 (typically RAM), an input/output (I/O) controller 408, an external device such as a display screen 410 via display adapter 412, serial ports 414 and 416, a keyboard 418, a fixed disk drive 420, a floppy disk drive 422 operative to receive a floppy disk 424, and a CD-ROM player 426 operative to receive a CD-ROM 428. Many other devices can be connected, such as a pointing device 430 (e.g., a mouse) connected via serial port 414 and a modem 432 connected via serial port 416. Modem 432 may provide a direct connection to a remote server via a telephone link or to the Internet via a POP (point of presence). Alternatively, a network interface adapter 434 may be used to interface to a local or wide area network using any wired or wireless network interface system known to those skilled in the art (e.g., Infiniband, Ethernet, xDSL, AppleTalk™, IEEE 802.11, and Bluetooth®).

Many other devices or subsystems (not shown) may be connected in a similar manner. Also, it is not necessary for all of the devices shown in FIG. 4 to be present to practice the present invention, as discussed below. Furthermore, the devices and subsystems may be interconnected in different ways from that shown in FIG. 4. The operation of a computer system such as that shown in FIG. 4 is readily known in the art and is not discussed in detail in this application, so as not to overcomplicate the present discussion. Code to implement the present invention may be operably disposed in system memory 406 or stored on storage media such as fixed disk 420, floppy disk 424, CD-ROM 428, or thumbdrive 436.

According to embodiments of the present invention, data access latency is minimized, throughput is maximized, and the programming model for applications that consume this real-time quote/trade data is simplified. Embodiments of the present invention adopt cluster computing technologies to migrate the processing to the source of the data by running the data distribution infrastructure on a single computational cluster. A Message Board is adapted to serve as an aggregation point for data being emitted out of a dynamic system under its observation.

Embodiments of the present invention are applicable to a range of real-time, control problems that arise across diverse set of industries including, by way of example, Distributed Computing, Energy, Financial Services, Medical, Military, Supply Chain/Manufacturing, Telecommunications, and the like. The remainder of this disclosure will focus on usage scenarios within the Financial Services industry, specifically the Capital Markets. In this context, the primary use case is real-time market data distribution its use by automated trading systems. A secondary use case is also introduced, which exists within the context of the market data distribution system. This second use case has broad applicability within the distributed computing industry.

Figure 5:
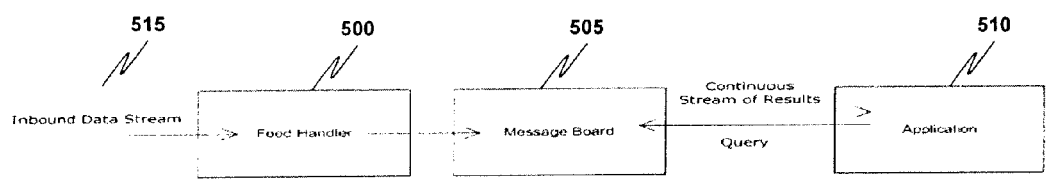
FIG. 5 is a block diagram that illustrates a system for low latency data in accordance with one embodiment of the present invention.

Turning now to FIG. 5, a system for low latency data in accordance with one embodiment of the present invention is presented. As shown in FIG. 5, a system for low latency data comprises three tiers: a feed handler 500, a message board 505, and one or more applications 510. Feed handler 500 is adapted to receive an input data stream 515 via a network interface (not shown in FIG. 5), de-encapsulate data in the input data stream 515, and distribute the de-encapsulated data to the message board 505. Message board 505 is adapted to receive the de-encapsulated data from feed handler 500, determine data to publish to one or more subscribers, and publish the stream of results including the data to publish. The determination is based at least in part on one or more filters associated with the one or more subscribers. The one or more applications 510 associated with the one or more subscribers are adapted to register for notification of particular data in the input data stream 515, and to receive notification of the particular data's publication. According to one embodiment of the present invention, the one or more applications 510 are adapted to register for notification of IP multicast data. According to another embodiment of the present invention, a subscriber's stream of results is made available for use by other subscribers.

According to embodiments of the present invention, message board 505 hides the complexity of parallel computing (e.g. Cluster, Grid, etc.) by (1) translating parameter-sweep applications into jobs that can be scheduled to be executed on one or more resources (computer systems), (2) managing the execution of the jobs, and (3) collecting the results of the execution when finished.

According to one embodiment of the present invention, message board 505 and the one or more consumer applications 510 are independent processes that are loosely coupled via an asynchronous communication mechanism. In this embodiment, the processes are assigned to cluster partitions, each with some amount of cluster resources previously allocated via an "Advance Reservation" facility. Exemplary cluster computing systems comprise an HP Cluster Platform 4000, available from Hewlett-Packard Company of Palo Alto, Calif., an IBM eServer 1650 Cluster, available from IBM of Armonk, N.Y., and the like. The features of these systems are summarized in FIG. 9.

Figure 6:
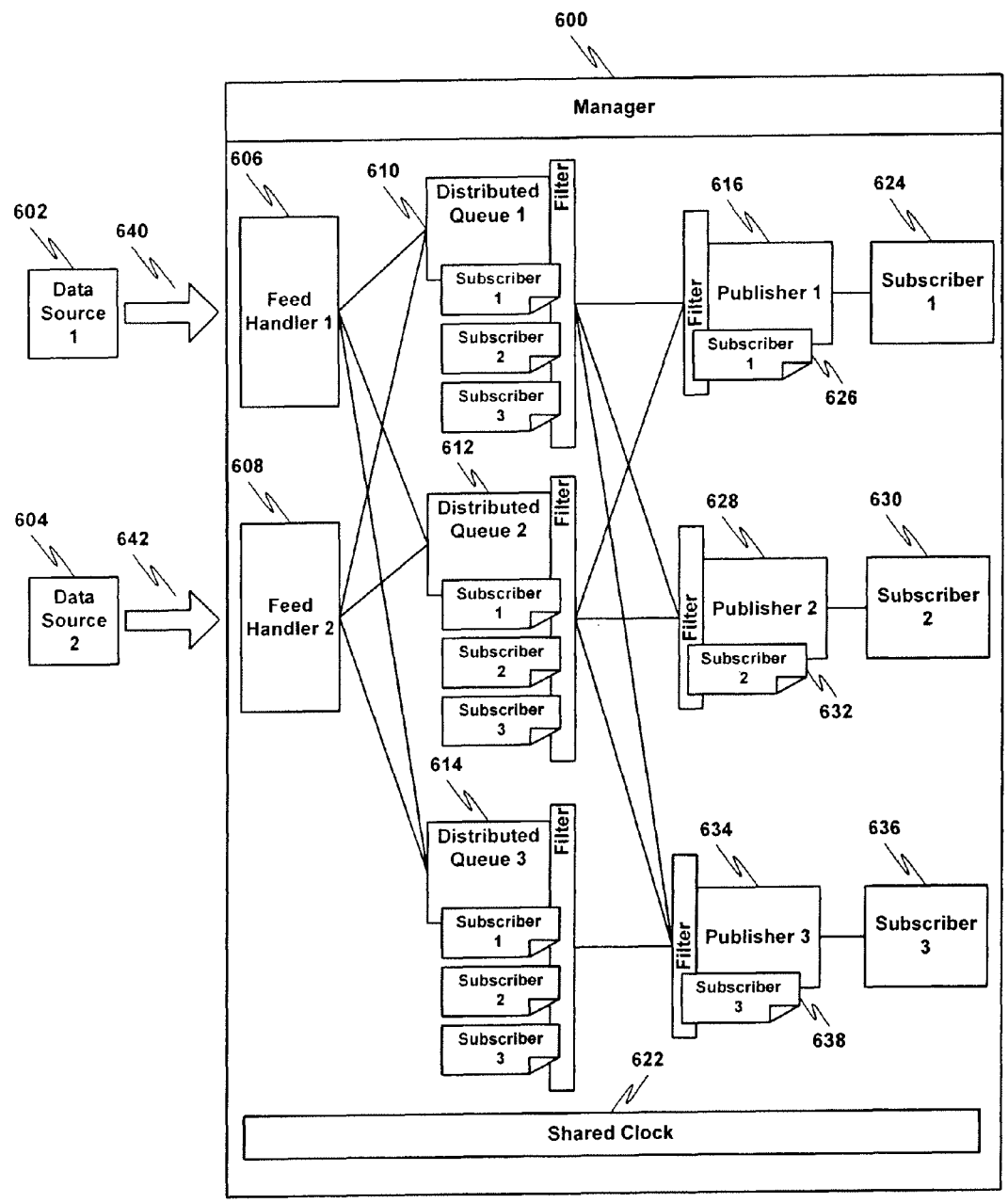
FIG. 6 is a flow diagram that illustrates a system for low latency data in accordance with one embodiment of the present invention.

FIG. 6 is a flow diagram that illustrates a system for low latency data in accordance with one embodiment of the present invention. The processes illustrated in FIG. 6 may be implemented in hardware, software, firmware, or a combination thereof. As shown in FIG. 6, data stream 640 from data source 1 (602) is feed into feed handler 1 (606), and data stream 642 from data source 2 (604) is feed into feed handler 2 (608). Each feed handler (606, 608) is further adapted to distribute the data it receives to one or more queues (610, 612, 614). Each of the one or more queues (610, 612, 614) is associated with one or more filters that filter the queued data based upon a time predicate and one or more secondary predicates established by a subscriber (624, 630, 636) to create filtered data. Data satisfying the time predicate and the one or more secondary predicates (filtered data) is distributed to a publisher (616, 628, 634) associated with the subscriber (624, 630, 636). According to one embodiment of the present invention, the feed handlers, distributed queues, publishers, and subscribers use a shared clock 2722. According to one embodiment of the present invention, the shared clock 2722 comprises a monotonic clock.

Figure 7:
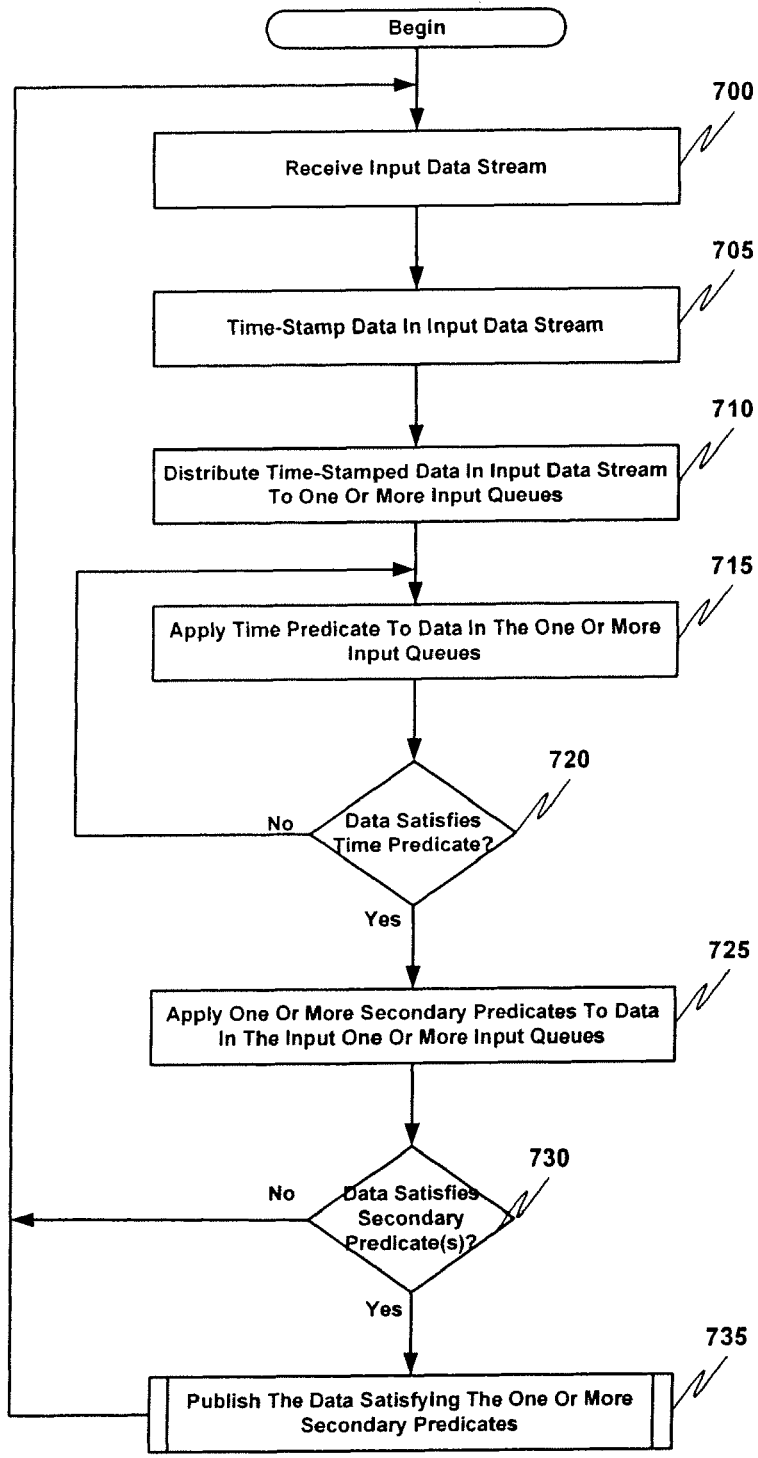
FIG. 7 is a flow diagram that illustrates a method for low latency data in accordance with one embodiment of the present invention.

FIG. 7 is a flow diagram that illustrates a method for low latency data in accordance with one embodiment of the present invention. The processes illustrated in FIG. 7 may be implemented in hardware, software, firmware, or a combination thereof. At 700, an input data stream is received. At 705, data in the input data stream is time-stamped. At 710, the time-stamped data is distributed to one or more input queues. At 715, a time predicate is applied to data in the one or more input queues. At 720, a determination is made regarding whether the time-stamped data satisfies the time predicate. If the time-stamped data does not satisfy the time predicate, execution continues at 715. If the time-stamped data satisfies the time predicate, at 725, one or more secondary predicates are applied to the data in the one or more input queues. At 730, a determination is made regarding whether the time-stamped data satisfies the one or more secondary predicates. If the time-stamped data satisfies the one or more secondary predicates, at 735, the data satisfying the one or more secondary predicates is published.

Figure 8:
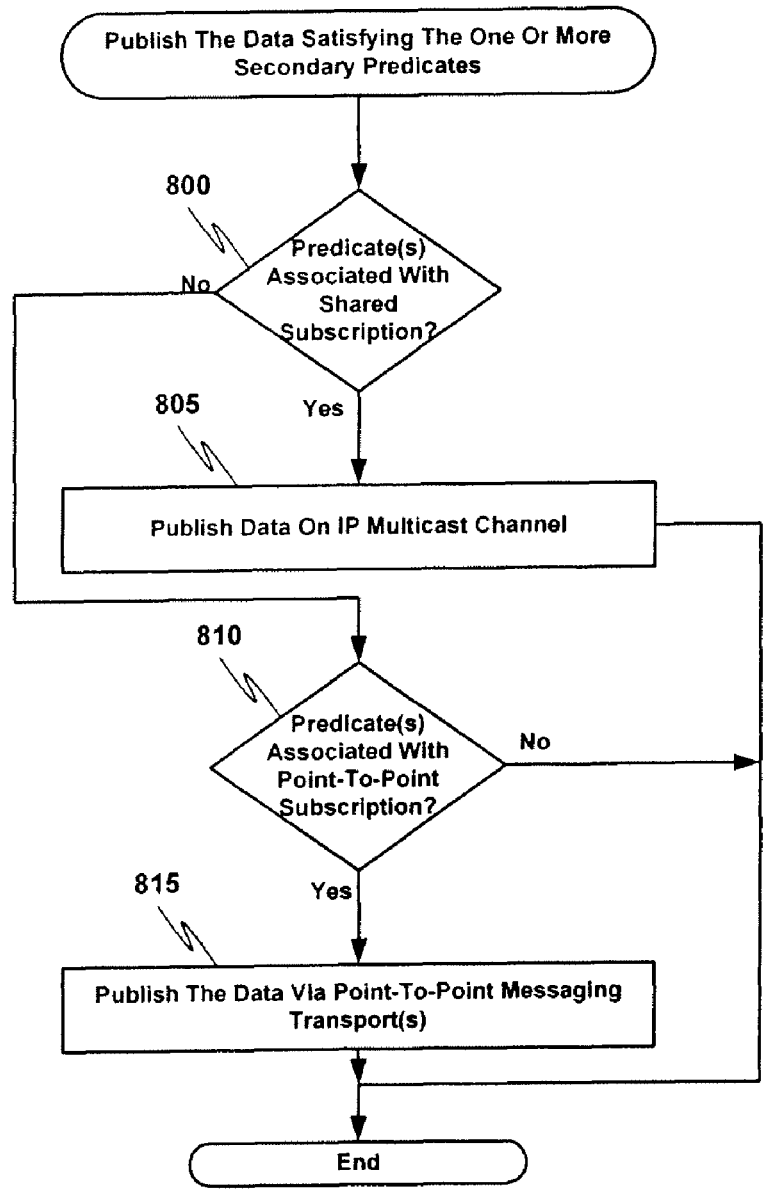
FIG. 8 is a flow diagram that illustrates a method for publishing data satisfying one or more secondary predicates, in accordance with one embodiment of the present invention.

FIG. 8 is a flow diagram that illustrates a method for publishing data satisfying one or more secondary predicates, in accordance with one embodiment of the present invention. FIG. 8 provides more detail for reference numeral 735 of FIG. 7. The processes illustrated in FIG. 8 may be implemented in hardware, software, firmware, or a combination thereof. At 800, a determination is made regarding whether the one or more secondary predicates satisfied by the time-stamped data are associated with a shared subscription. If the data is associated with a shared subscription, at 805, the data is widely published, e.g. by making the data available on an IP multicast channel or the like. If at 800 the data is not associated with a shared subscription, at 810, a determination is made regarding whether the one or more secondary predicates are associated with a point-to-point subscription. If the one or more secondary predicates are associated with one or more point-to-point subscriptions, at 815, the data is published via one or more point-to-point messaging transports. As mentioned above, a subscriber may subscribe for a data stream created by another subscriber.

According to one embodiment of the present invention, the message board architecture is based on Selfridge's Pandemonium model. The Pandemonium model comprises four layers, each grouping demons specialized for specific tasks. The bottom layer comprises the storage area and hosts demons that store and pass on data. The second layer comprises one or more demons that filter and weigh the evidence from the first layer: This is where the information processing is taking place; computational demons process the data of the first layer into information and pass it on to the next level. The third layer comprises one or more demons that rate the data received from layer 2 and pass this on to the decision layer. Finally, at the top layer lies a single decision demon adapted to decide what information is actually presented to the system.

An illustration of Selfridge's Pandemonium model can be seen in the routing protocols used within the Internet. Examples of these protocols include Routing Information Protocol (RIP), Open Shortest Path First (OSPF), Border Gateway Protocol (BGP), and Multi-Protocol Label Switching (MPLS). Peers within the Internet each maintain a routing table that is based on the Trie data structure and is maintained via a mechanism derived from Bellman's dynamic Programming. A description of Bellman's dynamic programming is found in Richard E. Bellman, "Dynamic Programming", Princeton University Press, 1957. Peers can be either hosts or gateways. Hosts communicate with one and other by exchanging messages while gateways are used to dynamically construct a channel based on some objective function. The routing protocol is orthogonal to the transmission of messages. It is used to allow peers, hosts, and gateways, to synchronize their routing tables and keep associated cost metrics up-to-date.

According to one embodiment of the present invention, a feed handler is adapted to aggregate one or more direct feeds from one or more markets (e.g. NASDAQ—National Association of Securities Dealers Automated Quotation, NYSE—New York Stock Exchange, OPRA—Options Price Reporting Authority, etc.), and deliver the aggregated direct feeds into a single computational cluster. Internally, the data is normalized across the feeds and then published on the cluster's internal interconnect to the message board. According to this embodiment of the present invention, front-end processing done by the feed handler is similar to Selfridge's Pandemonium's bottom layer, providing an aggregation point for receiving data from the "world" being observed. In the next layer, a dynamic pool of filters exists that sifts the "live" data being stored by the message board as it arrives. These filters represent simple predicates that can be added to and deleted from the pool.

According to one embodiment of the present invention, a message board 505 allows a feed handler 500 to write data at a relatively high rate by maximizing data parallelism. Various types of parallel programming patterns are summarized in FIG. 10. In more detail, a relatively high rate is achieved by de-serializing the data stream into a tabular form that is strategically partitioned. As data (e.g. a quote/trade) arrives, it is routed to its partition. In a market data application, this routing may be performed using a hashing function based on the exchange's symbol. By way of example, suppose the logical layout of a quote/trade data stream is represented by the following data structure written in the C programming language:

```
[DataContract]
struct TICK
{
    [DataMember] public string Symbol;
    [DataMember] public float volume;
    [DataMember] public float bid;
    [DataMember] public float ask;
    [DataMember] public datetime timestamp;
}
```

Figure 12:
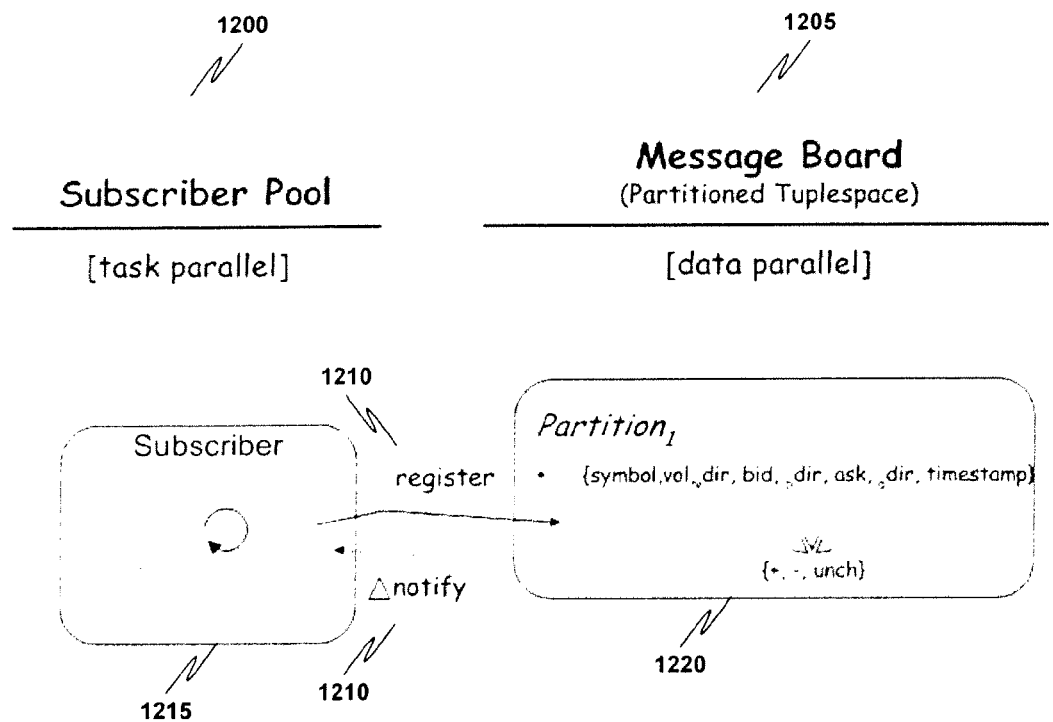
FIG. 12 is a block diagram that illustrates parameter sweep in accordance with one embodiment of the present invention.
Figure 13:
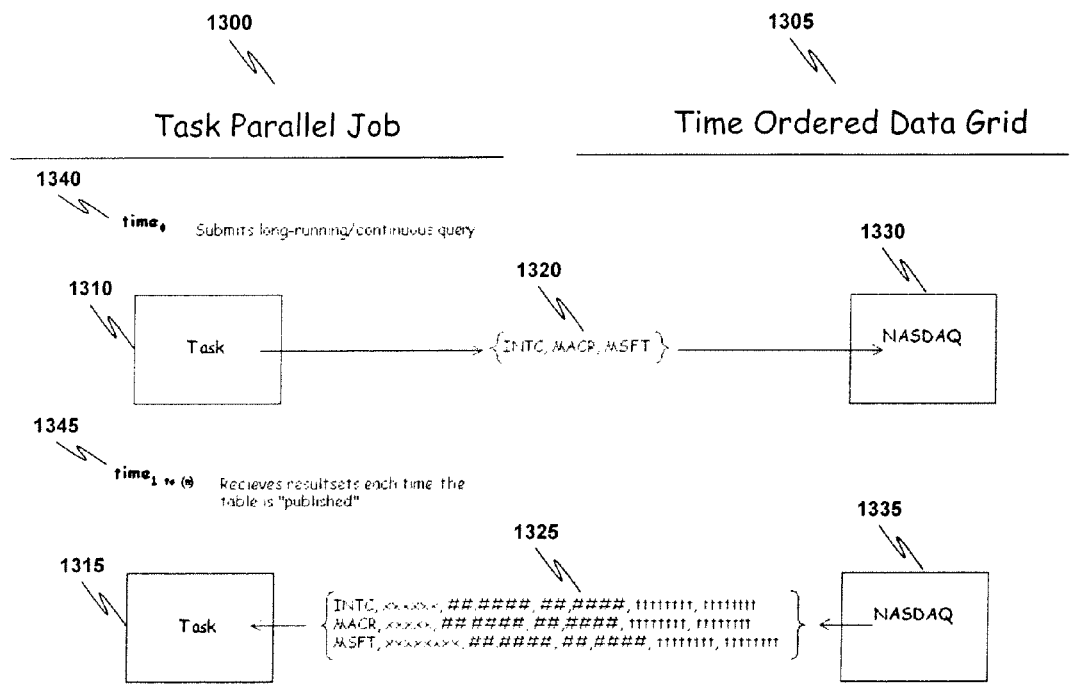
FIG. 13 is a block diagram that illustrates parameter sweep in accordance with one embodiment of the present invention.

In this example, according to an embodiment of the present invention, an in-line, continuous query can detect an exchange's symbol, look-up its partition, and then route the stream to that partition. This parameter sweep is illustrated in FIGS. 11, 12, and 13.

Figure 11:
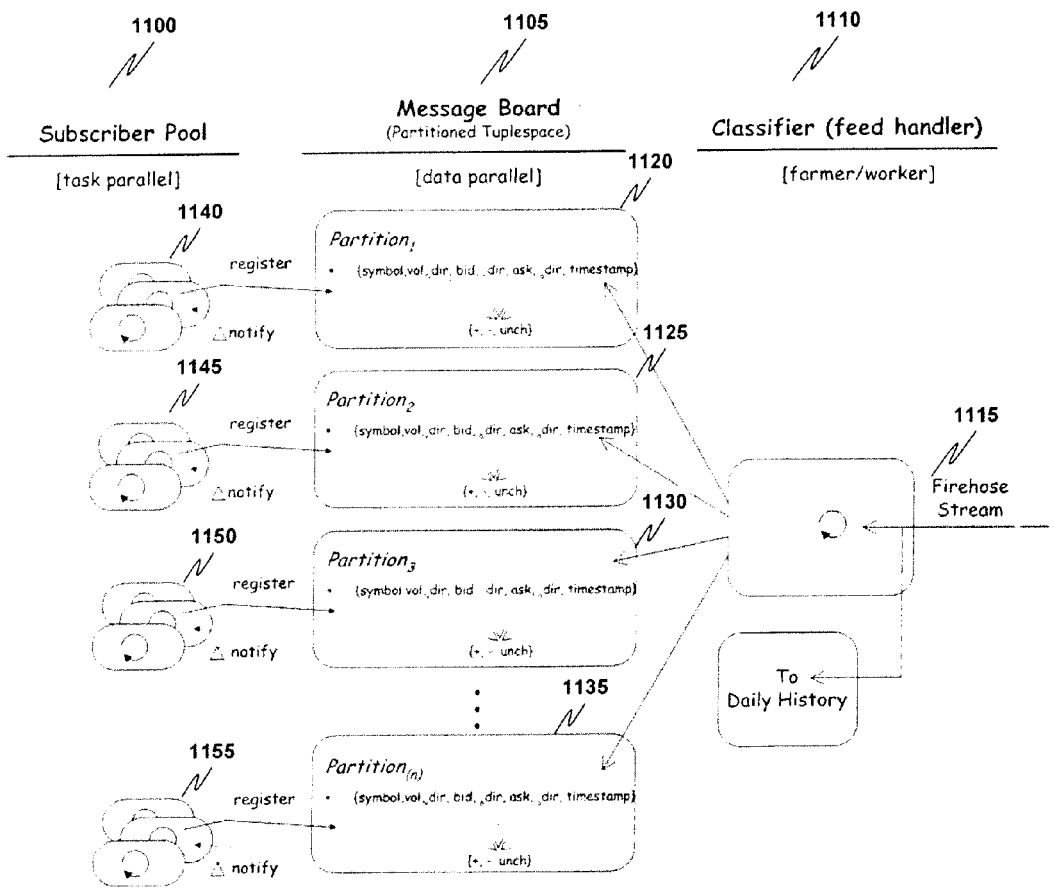
FIG. 11 is a block diagram illustrating a system for low latency data in accordance with one embodiment of the present invention.

Turning now to FIG. 11, a block diagram illustrating a system for low latency data in accordance with one embodiment of the present invention is presented. The data shown in FIG. 11 comprises market data. As shown in FIG. 11, feed handler 1110 receives a data stream 1115 containing data relating to multiple stocks. Feed handler 1110 applies a "farmer/worker" programming pattern to the data stream 1115.

Still referring to FIG. 11, message board 1105 comprises partitions (1120, 1125, 1130, 1135). Message board 1105 applies the "data parallelism" programming pattern to the data received from the feed handler 1110.

Still referring to FIG. 11, subscriber pool 1100 represents one or more subscribers (1140, 1145, 1150, 1155) that apply the "task parallelism" programming pattern to the data received from the message board 1105.

Turning now to FIG. 12, a block diagram that illustrates parameter sweep in accordance with one embodiment of the present invention is presented. FIG. 12 provides more detail for the interaction between the subscriber pool and message board illustrated in FIG. 11. As shown in FIG. 12, a subscriber 1215 subscribes or registers (1210) with message board 1205 to receive notifications 1210 regarding one or more stocks. Thereafter, subscriber 1215 receives notifications 1210 when message board 1205 determines that data in the input data stream satisfies one or more predicates established by a filter submitted by the subscriber 1215.

Turning now to FIG. 13, a block diagram that illustrates parameter sweep in accordance with one embodiment of the present invention is presented. FIG. 13 provides more detail for the registration and notification aspects illustrated in FIG. 12. As shown in FIG. 13, at time to (1040), task 1310 subscribes or registers to receive notifications regarding one or more stocks 1320. Subsequent to time $t_0$ (1040) (i.e. at time $t_0$ to $t_{(n)}$ (1045)), task 1315 receives one or more result sets containing data relating to the one or more stocks (1025) each time the data is published.

According to one embodiment of the present invention, this switching mechanism is based on a "trie" to efficiently recognize a discrete quote/trade using a stateful inspection mechanism, referred to as a stream processing engine. Stream processing engines suitable for implementing aspects of the present invention include, by way of example, the StreamBase stream processing engine, available from StreamBase Systems, Inc. of Lexington, Mass., MIT's Borealis stream processing engine, Stanford's STREAM processing engine, and the like).

Figure 14:
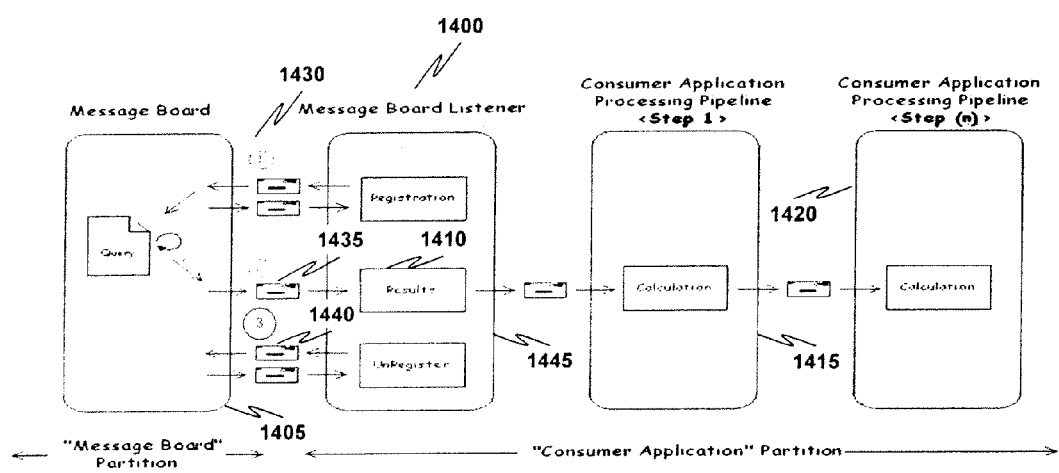
FIG. 14 is a block diagram that illustrates a system for low latency market data including a message board listener in accordance with one embodiment of the present invention
Figure 15:
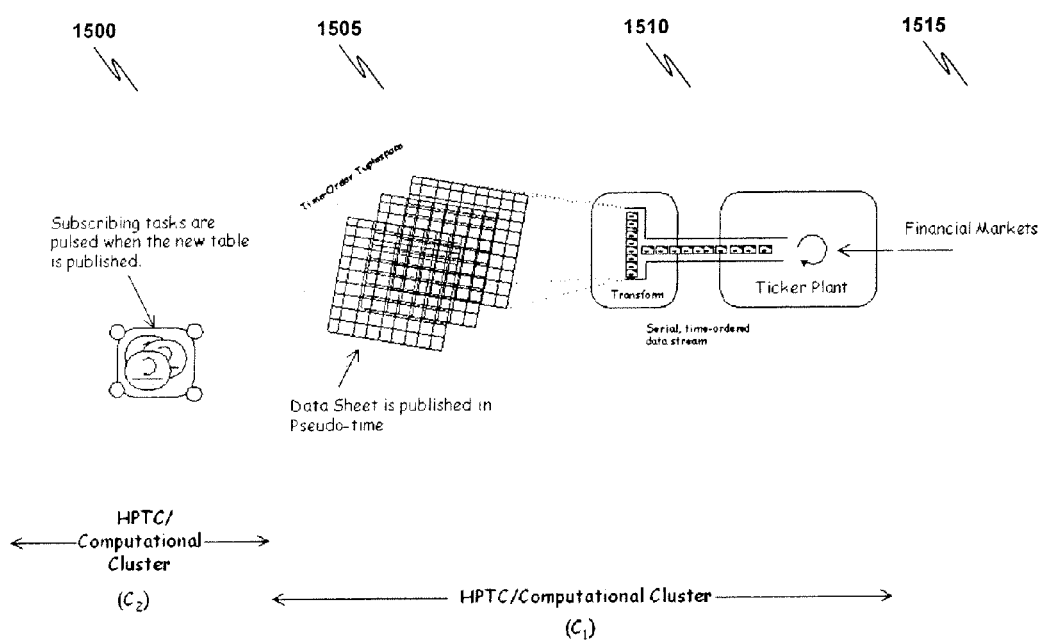
FIG. 15 is a block diagram that illustrates computational clusters in a system for low latency data in accordance with one embodiment of the present invention.

Referring now to FIG. 14, according to one embodiment of the present invention, a message board listener 1400 is a front-end process designed to receive results from a message board 1405. As shown in FIG. 14, the message board listener 1400 is adapted to scale out across multiple systems based on the arrival rate of messages/events, which are primarily query result sets, from message board 1405. As messages/result sets arrive from the message board 1405, they are handled by message board listener 1400, which serves as an I/O front-end to a compute cluster 1415. When a result set arrives, message board listener 1400 posts it to the cluster 1415 for processing. This is illustrated in FIG. 15.

Figure 16:
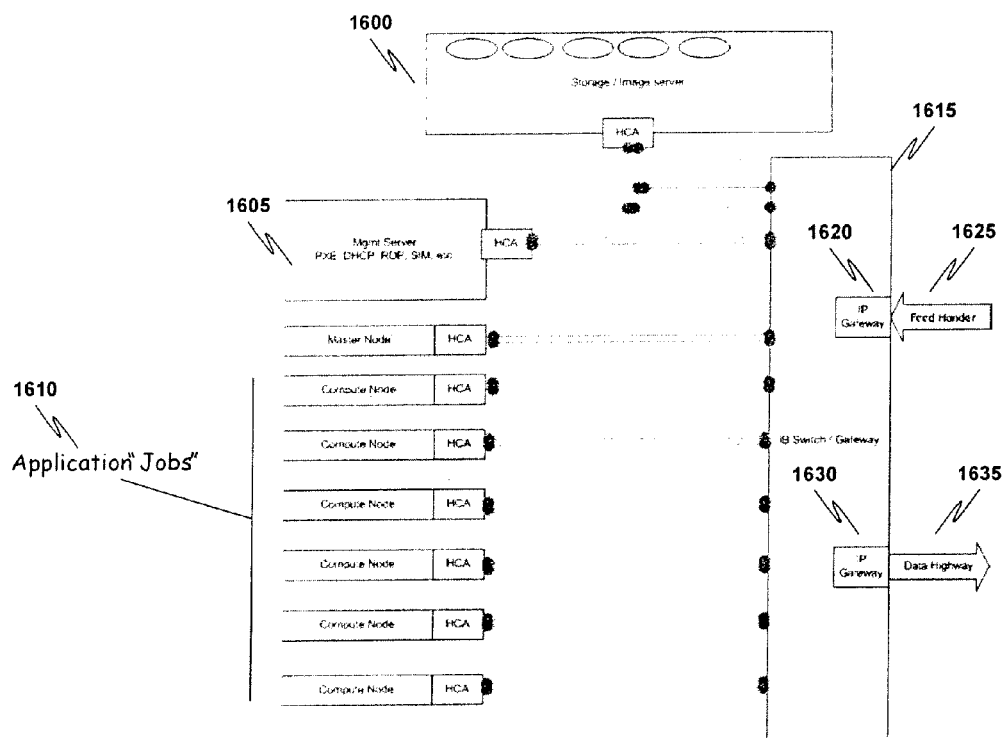
FIG. 16 is a block diagram that illustrates a compute farm in a system for low latency data in accordance with one embodiment of the present invention.

According to one embodiment of the present invention, a direct connection is established between the Feed Handler and an "R" LVS Front-end, which is referred to as the "Message Board Listener." According to one embodiment of the present invention, the direct connection comprises a cluster interconnect of the Beowulf style. According to one embodiment of the present invention, the direct connection is a front-ending a compute farm and can be implemented using RPVM ("R" interface to Parallel Virtual Machine), SNOW (Simple Network of Workstations), or the like. Such a compute farm is illustrated in FIG. 16.

By way of example, imagine a Monte Carlo simulation is dispatched on an RPVM cluster. Instead of generating a random number, the front-end message board listener allows for real-time input from the data source(s). The children processes then receive the data (i.e. the "tick") and process it accordingly. Possible pseudo code for a market data application is as follows:

```
Msgboard_listener::onMessage([in] tick, [in] children, [in] tag)
{
    .PVM.Send(children[i], tick, tag)
}
```

An example implementation of a message board listener 1400 is an "R" server front-end that assumes the use of SNOW or RPVM, either of which enable R to become a parallel processing environment. In implementing the message board listener 1400 for this example, R's embedding mechanism for front-ends is used. This mechanism provides for both (1) an event loop and (2) callbacks.

According to another embodiment of the present invention, a message board allows the Feed Handler to write data at very high rate by maximizing task parallelism. In more detail, a collection of independent, asynchronous tasks are used. Task parallelism is maximized in applications that are consuming a data stream. The arrival of a discrete quote/trade into its partition is treated as an "event." These events are then published. Applications "subscribe" to events by dispatching tasks that register their interest by issuing a continuous query against the appropriate partition. When the predicate of their query is satisfied, the applications receive notification via a callback mechanism. Using the C-style data structure defined in the above example, and assuming a partition is represented as a URI:

tcp://marketdata.ml.com/nasdaq

Then a "task" could be dispatched that issues a query as follows:

```
select *
from "tcp://marketdata.ml.com/nasdaq"
where Symbol in{'INTC', 'MSFT', 'ORCL'}
```

According to this embodiment of the present invention, a "Message Board" service that will accept this query is defined; publishing a result set to the subscribing task each time any of these three securities are written into the partition. Another example of this callback mechanism is presented in FIG. 17.

Figure 22:
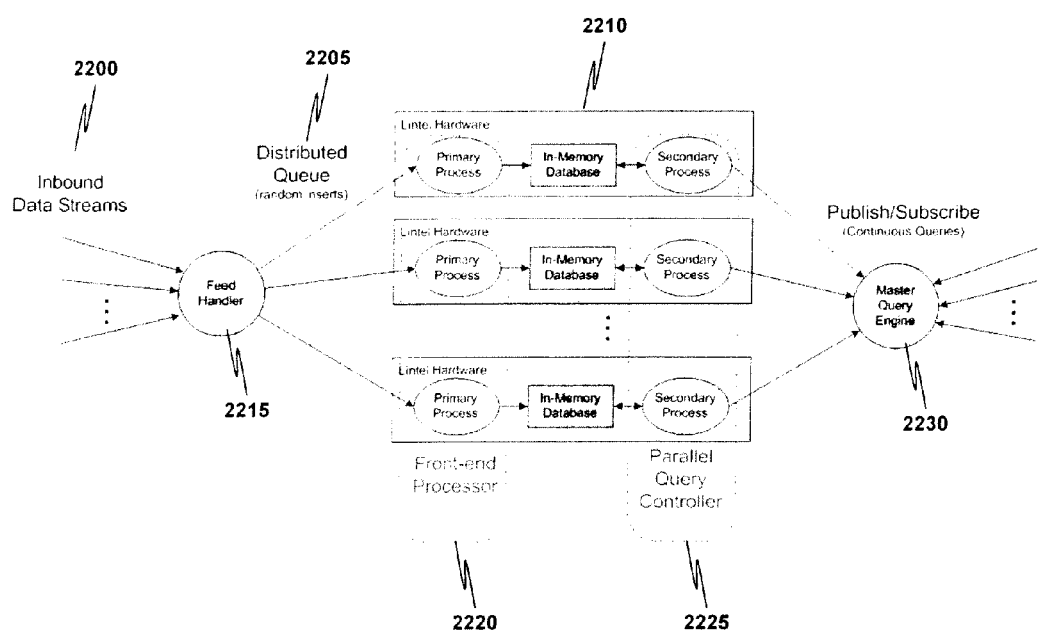
FIG. 22 is a block diagram that illustrates message board communication in accordance with one embodiment of the present invention.

In scientific computing, a parameter-sweep application is a combination of data and task parallelism. The application is decomposed into a data production step and a data processing step. Often referred to as "Task Parallelism," this latter process is further broken down into a set of tasks that are arranged in a processing pipeline. According to one embodiment of the present invention, in the message board architecture, the data production step is a "Continuous Query." This query is associated with the "Job" and is dispatched as depicted in FIG. 22.

Figure 18:
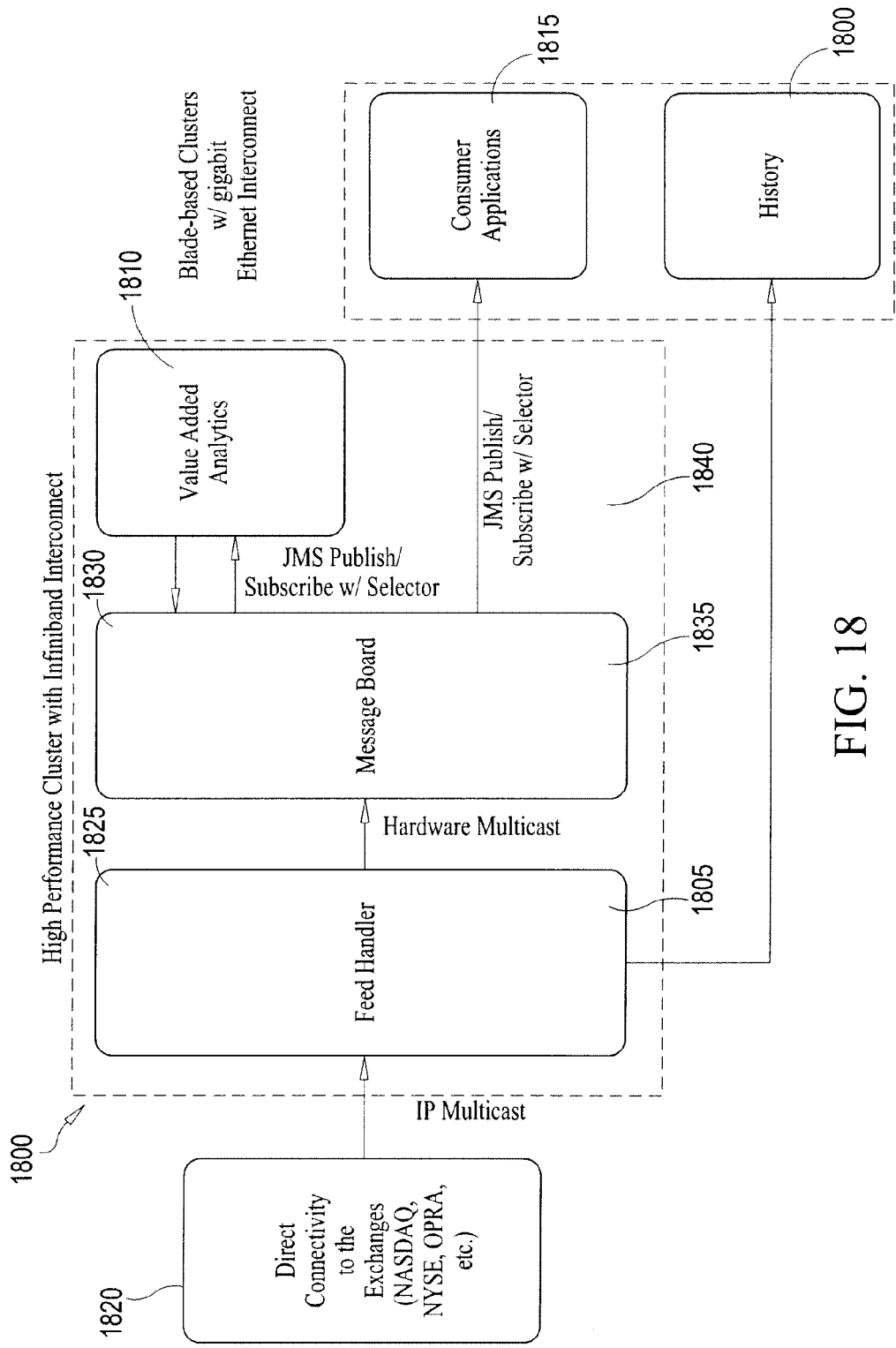
FIG. 18 is a block diagram that illustrates a system for low latency data in accordance with one embodiment of the present invention.

Referring to FIG. 18, according to one embodiment of the present invention, message board 1800 is an in-stream mechanism that resides between feed handler 1805 and message board listener, and provides at least two capabilities: (1) filtering and (2) value-added analytics 1810. An example of value added analytics is applying a particular algorithm to a metric calculation (e.g. volume weighted average price (VWAP)), and then making the resulting stream available to other subscribers.

Figure 2:
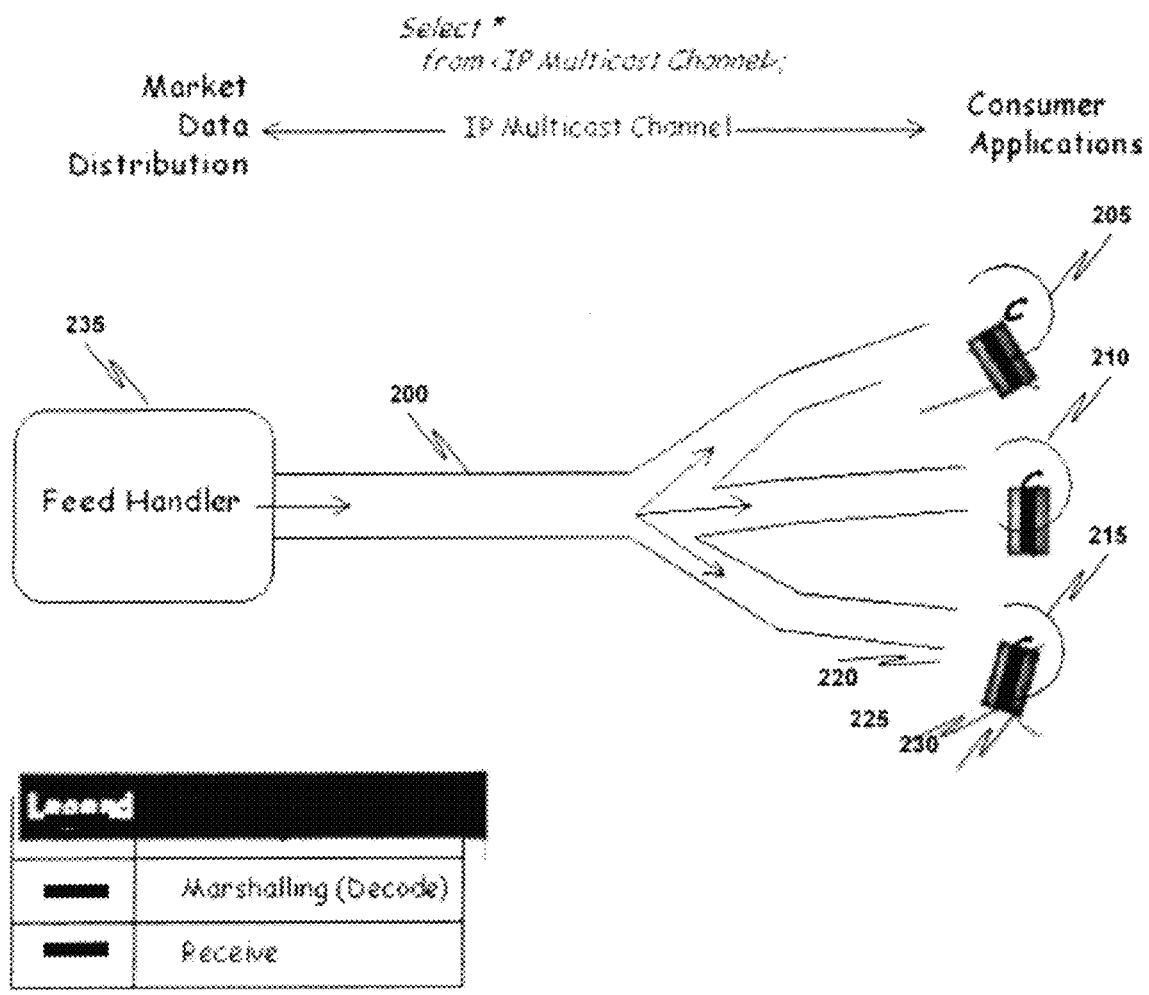
FIG. 2 is a flow diagram that illustrates a system for market data distribution.
Figure 3:
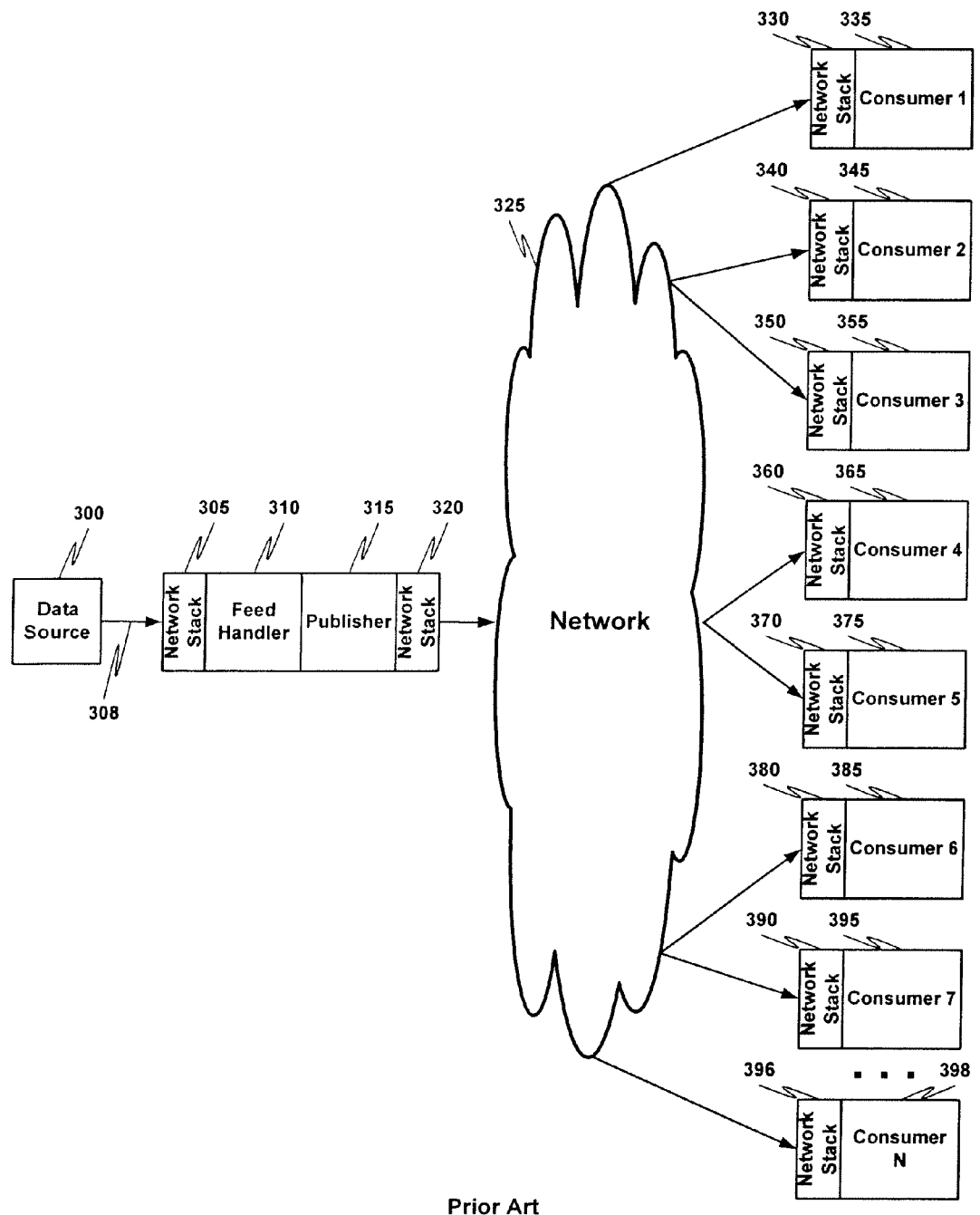
FIG. 3 is a detailed flow diagram that illustrates a system for market data distribution.

As discussed previously with respect to FIG. 2, one problem with the "fire hose" approach of having the Feed Handler 1805 publish all of the data directly to consumer applications is that each consumer application 1815 must process all of the data. As depicted in FIG. 2, this processing is redundant and frequently inefficient. For example, the cost of un-marshalling the data is born by all of the consumer applications. Further, the consumer applications must each filter out data that is not needed. In contrast, when a message board is introduced, un-marshalling is done once for all of the data. While an additional marshalling step is incurred for marshalling result sets of continuous queries.

To accomplish this, according to one embodiment of the present application, a consumer application, referred to as a "Job," includes the query (or set of queries) associated with this instance of the application. The query issued to a message board by a job instance is one of many queries running simultaneously. FIG. 19 is a block diagram that illustrates a system for low latency market data in accordance with one embodiment of the present invention. As depicted in FIG. 19, these queries (1940, 1945, 1950) issued to the message board 1935 are resolved in parallel through the use of a parallel stream processing engine 1915.

According to one embodiment of the present invention, when a cluster's scheduler dispatches a job for execution, it orchestrates steps 1 and 2 as depicted in FIG. 14. Step 1 (1430) is a registration of the query; linking the message board and the job instance. Step 2 (1435) represents the ongoing processing that represents the resolution of the continuous query and the delivery of any results to the job. This delivery is facilitated by the message board listener mechanism, which serves as an I/O front-end. The message board will continue to process the query until step 3 (1440) is carried out and the query is unregistered.

According to embodiments of the present invention, a first task subscribes to a set of instruments being published by the message board. Subscriptions are expressed in terms of a Structured Query Language (SQL)—like query. These are issued as continuous data stream queries which provide an asynchronous callback method. Examples of such asynchronous callback methods include Linux Asynchronous I/O (AIO), .NET Delegate, J2EE Message-Driven Beans (MDB), and the like. These methods are described in more detail below.

According to one embodiment of the present invention, task parallelism is implemented via C/C++ using AIO.

According to another embodiment of the present invention, task parallelism is implemented the Microsoft's .NET environment. Microsoft's Web Services Enhancement (WSE) messaging stack emphasizes the one-way message exchange pattern. WSE supports custom transports (e.g. MQSeries, Memory Mapped Files, Named Pipes, etc). WSE also provides support for Staged Event-Driven Architecture (SEDA) via the .NET Delegate programming paradigm.

Indigo is a set of .NET technologies for building and running connected systems. Indigo unifies and extends Microsoft's existing messaging products: ASMX, .NET Remoting, .NET Enterprise Services, Web Services Enhancements, and System.Messaging (MSMQ). Indigo supports traditional messaging, with non-blocking calls carrying a single message parameter. According to this embodiment of the present invention, the asynchronous delegate pattern is used for dispatching tasks.

According to another embodiment of the present invention, task parallelism is implemented the J2EE MDB environment. The following are possible entries in the configuration file for the MDB for a market data application:

```
selector = "Symbol In('INTL', 'MSFT')";
topic = "marketdata.ml.com/nasdaq";
```

A corresponding MDB class definition is as follows:

```
public class Seda implements MessageDrivenBean,
MessageListener
{
    private transient MessageDrivenContext
    mdbContext;
    public void
    setMessageDrivenContext(MessageDrivenContext ctx)
    {
        mdbContext = ctx;
    }
    public void ejbRemove( ) { }
    public void ejbCreate( ) { }
    public void onMessage(Message message)
    {
        // event processing goes here
    }
}
```

According to one embodiment of the present invention, a message board comprises the StreamBase™ stream-processing engine, available from Streambase Systems, Inc. of Lexington, Mass. The StreamBase™ stream-processing engine may comprise a content-based tuple router adapted to receive normalized, cleaned input ticks from the Feed Handler and assign each tick to a "partition" (i.e., substream) on the basis of the tick's symbol. According to another embodiment of the present invention, the StreamBase™ stream-processing engine is adapted to serve as a content-based publish/subscribe system that allows client applications to dynamically subscribe to an existing partition by expressing predicates on the contents of the messages that they would like to receive. These two aspects are described in more detail below.

According to one embodiment of the present invention, the StreamBase™ stream-processing engine is adapted to receive normalized input tick streams from a feed handler. The StreamBase™ stream-processing engine runs a continuous query that (1) decides to which stream partition each tick needs to go and then (2) routes it to the corresponding partition. The query that accomplishes this operation may use an in-memory routing table of partitions where each entry is a tuple with format (symbol, partition). By way of example, if each tick has the format (symbol, volume, bid, ask, tstamp), a table look-up operation may identify the entry with the matching tick symbol and use the corresponding partition identifier for routing.

According to one embodiment of the present invention, each "partition" comprises a sub-stream of the normalized input feeds coming from the Feed Handler. The StreamBase™ stream-processing engine incorporates a dynamic publish/subscribe mechanism that allows the registration of continuous subscription-style queries on streams. This mechanism enables client applications to register queries, e.g. in the form of simple SQL-like predicates, over partitions. Each tick arriving to a partition will then be run against the queries subscribed to that partition. Matching tuples are forwarded to the appropriate clients.

Figure 20:
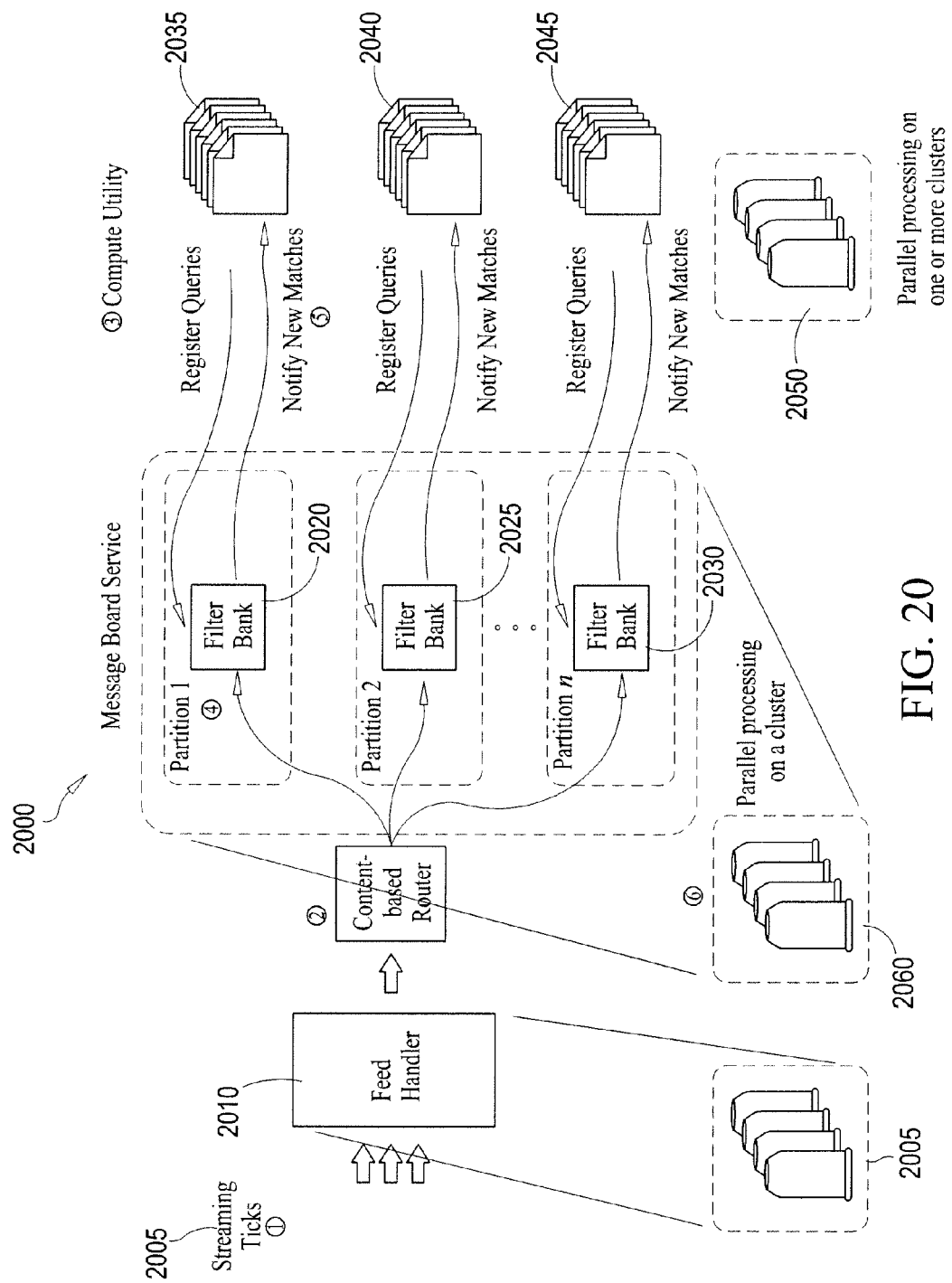
FIG. 20 is a block diagram that illustrates a system for low latency data in accordance with one embodiment of the present invention.

According to one embodiment of the present invention, the StreamBase™ stream-processing engine's "Filter Bank" operator is used to achieve real-time matching across one or more client queries and fast tick streams. This built-in operator organizes the registered queries as a compact "discrimination network", indexing them based on their syntactic characteristics. This technique enables matching operations to take place very quickly. This is illustrated in FIG. 20.

According to one embodiment of the present invention, one or more clients register their queries using an RPC (remote procedure call) mechanism that includes the partition identifier. The results are sent to the client machine through a TCP (transmission control protocol) connection and then picked up for consumption by the client application via an appropriate asynchronous callback mechanism (such as POSIX AIO or the like).

Figure 21:
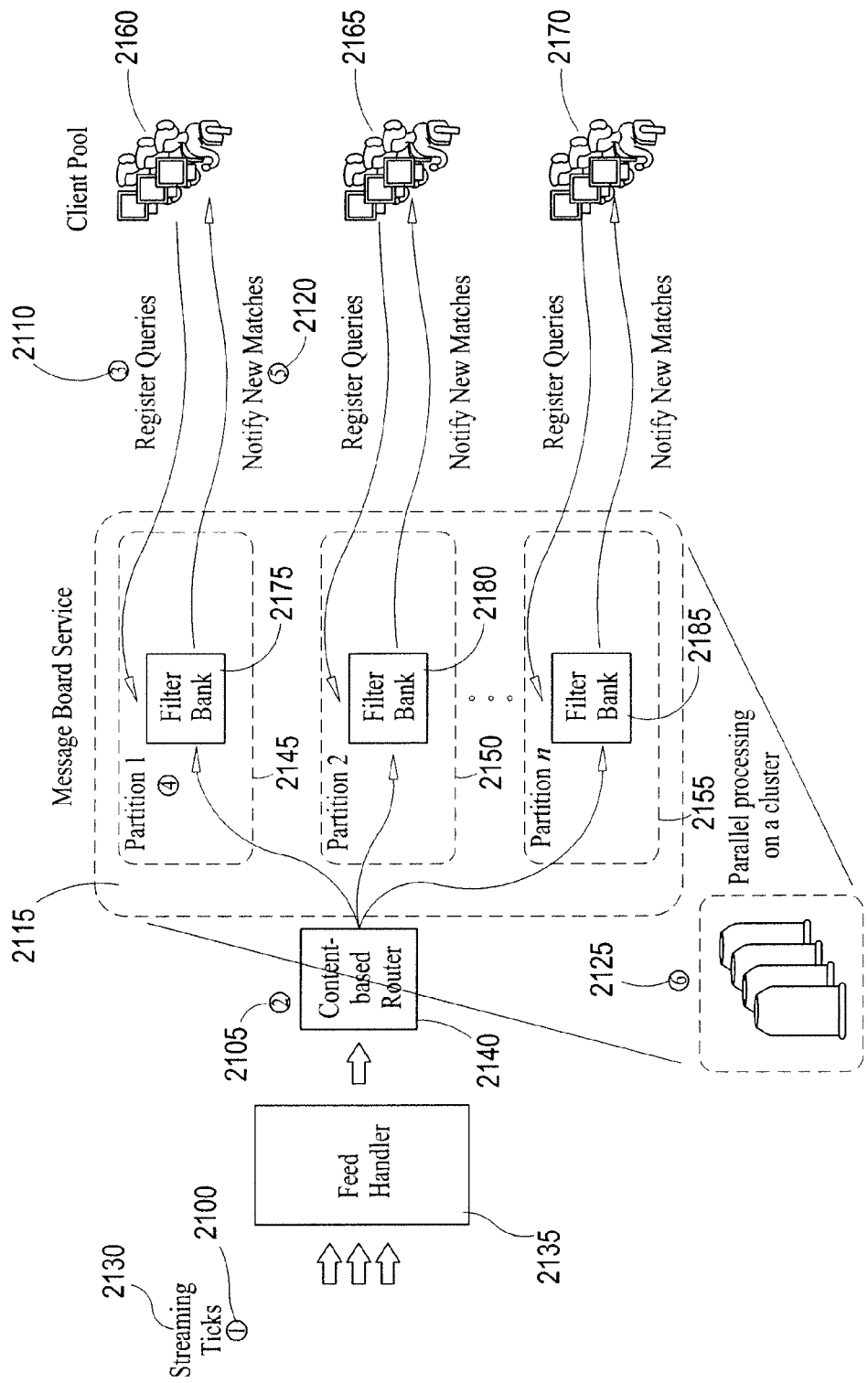
FIG. 21 is a block diagram that illustrates a system for low latency data using a StreamBase™ stream-processing engine in accordance with one embodiment of the present invention.

FIG. 21 summarizes how the StreamBase™ stream-processing engine can be integrated to serve as a message board for real-time tick streams, in accordance with one embodiment of the present invention. At step 1 (2100), push-based tick streams 2130 are input to feed handler 2135, which performs aggregation, cleaning, normalization. At step 2 (2105), normalized feeds are then sent to content-based switch 2140 that classifies ticks on the basis of their symbols and routes them to the appropriate stream partitions (2145, 2150, 2155). At step 3 (2110), one or more clients (2160, 2165, 2170) register queries (e.g. simple predicates) over partitions (2145, 2150, 2155) by issuing RPC requests. At step 4 (2115), each partition (2145, 2150, 2155) is served by a "Filter bank" (2175, 2180, 2185) that stores the queries and indexes them for fast matches. At step 5 (2120), as new ticks arrive to a partition (2145, 2150, 2155), the filter bank (2175, 2180, 2185) matches them to the registered queries in real-time and notifies the corresponding clients (2160, 2165, 2170) through TCP. Client processes (2160, 2165, 2170) get asynchronous callbacks as they receive notifications. At step 6 (2125), entire processing is distributed and parallelized across a cluster of machines for improved performance, scalability, and availability.

While the StreamBase™ stream-processing engine has been used to illustrate embodiments of the present invention, any other product with similar features may be used as well without departing from the inventive concepts disclosed herein. Such features may include support for distributed operation for improved scalability (primarily through parallel execution) and availability, and support for the addition of new client queries to the system "on the fly" without the need to stop the execution or re-compile application code. Such features may also include a single-process model where time-critical operations (including tick partitioning/routing, publish/subscribe, and routing table storage) are run in a single process space on a single CPU, all in main-memory whenever possible, thus reducing high-overhead process context switches that are present in solutions that use multiple software systems to collectively provide the same set of capabilities.

In the financial markets, real-time and historical "Tick" data is the life blood of market participants. From an object perspective, this data can be viewed as a class that has a few key time varying properties as represented in the following schema:

```
class Instrument
{
    Symbol,
    Bid/Price,
    Ask/Price,
    Volume,
    Quote/Trade,
    Timestamp
}
```

Objects of this class can be viewed in terms of a time-series, or "Data Stream," that represents the system's dynamism. While not physical in nature, this system exhibits the same stochastic behaviors as those governed by the laws of physics.

A dynamic system such as the financial markets can be viewed in terms of changes over time. Instances of the Instrument class (i.e. objects) can be thought of as messages that convey state changes within the system. The Message Board's role within this context is to serve as a computer-assisted decision support tool. In other words, it is a mechanism for communicating with the markets.

The ability to interact with the evolution of these groups both in real-time as well as historically is provided in accordance with embodiments of the present invention. This interaction needs to be consistent in terms of the namespace and object model. Also, the ability to move seamlessly between current and historical perspectives of this model is provided; zooming, panning, and rotating the perspective in which data is observed, thus providing accurate predictions about the model's evolution within this context.

Generally, the approach can be thought of as an implementation of Selfridge's Pandemonium where the bottom layer comprises one or more sensors adapted to collect data from the market (i.e. the "Feed Handler"). This data is then posted into a distributed queue which represents the random variables of a Monte Carlo simulation. The simulation itself occurs in layer 3. For example, a simulation might maintain VWAP and TWAP for some grouping (i.e. Watchlist, Chain, Portfolio, Index, etc). VWAP and TWAP are "Volume Weighted Average Price" and "Time Weighted Average Price", respectively. Finally, the mechanism for decisions resides at layer 4 of the implementation. This mechanism could be a spreadsheet with a "live" graphical 3-D display of the simulation, an automated pricing job running on a high-performance cluster, or a combination of both.

Examples queries include the following (assume it is 1 PM when the request is issued)
- "Give me IBM's Volume weighted Average Price (VWAP) from 10 AM until 2 PM."
- "Give me IBM's Time Weighted Average Price (TWAP) from 10 AM until 2 PM."
- "Give me MSFT 'Chain' VWAP from 10 AM until 2 PM," where chain is all of the MSFT derivative instruments.
- "Give me some arbitrary grouping's TWAP from 10 AM until 2 PM," where grouping represents a user-defined container of instruments Several events over the past several years serve to illustrate how pervasive reliance on distributed computing has become. These include the terrorist attack on the World Trade Center on Sep. 14th, 2001, and the power outage that hit the east coast of the United States in the summer of 2003. Each of these events occurred randomly but all had significant impact on the global financial markets. In fact, large scale outages that impact the global markets occur annually.

Chun et al. defines an Information Plane to be "a service or service component that efficiently delivers timely and relevant data about the state of the system to all the dispersed components of the system." At a macro level within the Financial Services industry, there is concern for continuity of critical services among infrastructure providers, their customers, and "interested" government agencies. This has led to a collective awareness of deficiencies in the incumbent distributed computing "information plane." Recently, an alternative, more coherent information plane has begun to emerge from the academic and applied research community.

The Globus Toolkit's Monitoring and Discovery Service (MDS) is an example of such an information plane. MDS is used by end systems for resource discovery, node monitoring, and load balancing. Other examples of such information planes exist in systems such as Planet-lab and the combination of Supermon and Nagios. In this scenario, software-based sensors are deployed to a variety of hosts: servers, network and storage devices, etc. It is also possible to provide sensors that collect instrumentation data from application software (e.g. from syslogd).

According to one embodiment of the present invention, a Message Board resides at the root of this "sensor network;" aggregating the data, correlating it according to some set of constraints, and then applying it to a model. Viewed from this perspective, a message board is similar to Oppenheimer et al.'s "SWORD" project.

According to one embodiment of the present invention, parallelism within the system is maximized. Complexity arises from the use of inexpensive, commodity hardware. In order to facilitate control over service qualities: resiliency, scalability, etc. it must be possible to dynamically add or delete capacity where it is needed. There are two distinct problems that must be addressed: (1) complexity in the communication between a feed handler and message board and (2) providing a query language for applications to access "live" data.

Metrics

According to one embodiment of the present invention, a modified (and generalized) version of Shasha's "Fintime Benchmark" is the basis for a cost function.

According to another embodiment of the present invention, the Response Time (aka Latency) metric is defined as the geometric mean of the execution time of each filter/expression (i.e. "Query") in the system.

$$R = \sqrt[n]{\prod_1^n Qi}$$

where Qi is the execution time for Query i

According to another embodiment of the present invention, the throughput metric is the average time taken to complete the set of queries currently registered with a message board $$T = \frac{\sum Ei}{N}$$

where Ei is the elapsed time to execute the set of queries in the system.

According to one embodiment of the present invention, the cost metric is used to bring the capabilities of the hardware into the equation. It is based on the assumption that additional hardware capabilities results in higher hardware costs. Thus the cost metric is defined as $$C = \frac{R \times T}{TC}$$

where R is the latency metric, T is the throughput metric, and TC is the total cost (e.g. expressed as a measure of some form of currency) allocated to the system in the time interval being measured.

According to one embodiment of the present invention, costs are allocated to consuming applications based on the queries they have submitted and the underlying resources consumed by those queries.

Dynamic Resource Allocation

According to one embodiment of the present invention, a message board is adapted to scale linearly by simply adding or deleting additional nodes. A node is a commodity, PC class computer composed of CPU, RAM, and I/O. To enable this "Grid" style scaling, a sophisticated load management capability is used. This capability may be economically motivated, where consumer applications pay for the Latency and Throughput characteristics they require.

According to one embodiment of the present invention, the underlying resource management mechanism used to deliver computation to filter/expressions operating within a message board is adapted to minimize latency and cost while maximizing throughput. To achieve this, the system's dynamism must be accounted for. In the case of a message board this comprises (a) streams of data coming into the system from the world being observed and (b) the total number of queries (i.e. filter/expressions) currently registered with the Message Board.

Communication Protocols

As discussed above, according to embodiments of the present invention, the architecture comprises three tiers: (1) a feed handler, (2) a message board, and (3) applications. Communication between a feed handler and a message board is done using a "Distributed Queue", while applications communicate with the message board using a "Publish/Subscribe" protocol. These protocols are depicted in FIG. 22.

According to one embodiment of the present invention, a message board subscription model is represented by a graph that describes an event's traversal from the point it arrives at the ingress of the feed handler until it is delivered to the subscribing consumer. Events are propagated from the ingress of the feed handler to the middle-tier using a "Distributed Queue", with events being queued up like samples in a sensor.

According to one embodiment of the present invention, a wire representation is used to marshal and de-marshal of messages to/from the communication channel. A combination of (A) MPI's derived types and its pack/unpack mechanism and (B) the sfsexp S-Expression library as it is used in the Supermon's Data Protocol can be used. According to one embodiment of the present invention, a message envelope using MPI's derived types and the pack/unpack mechanism is defined, and the body of the message is encoded using Supermon's data protocol.

The actual layout of the tick data may be based at least in part on Shasha et al.'s "Fintime Benchmark," specifically what Shasha et al. refers to as the "Model 2: Tick database for financial instruments."

```
structure Tick {
<Id, Char(30)>,
<SeqNo, Long>
<TradeDate, Date>
<TimeStamp, Time>
<TradePrice, Double>
<TradeSize, Long>
<AskPrice, Double>,
<AskSize, Double>,
<BidPrice, Double>
<BidSize, Double>,
<Type, Char>
};
```

According to one embodiment of the present invention, the Feed Handler outputs Ticks in the above format using a generalized version of Supermon's Data Protocol and Programmatic Interface.

Since a solution must guarantee message boundaries (i.e. it can never be the case where a message results in two packets with one going to one host and the other packet going to a 2nd host) the first question that must be addressed is at what protocol layer is the 'spray' function implemented? This protocol must be part of a messaging/transactional API above the Sockets layer.

According to one embodiment of the present invention, a feed handler is adapted to view a message board as a single queue where it blindly posts tick data. Internally, a message board's client API is adapted to handle the requisite connection pooling to insure messages are 'sprayed' across servers in the message board's pool. On the server side, the message board process implements an Event Loop with callbacks to handle errors, connection requests, and reads.

Figure 23:
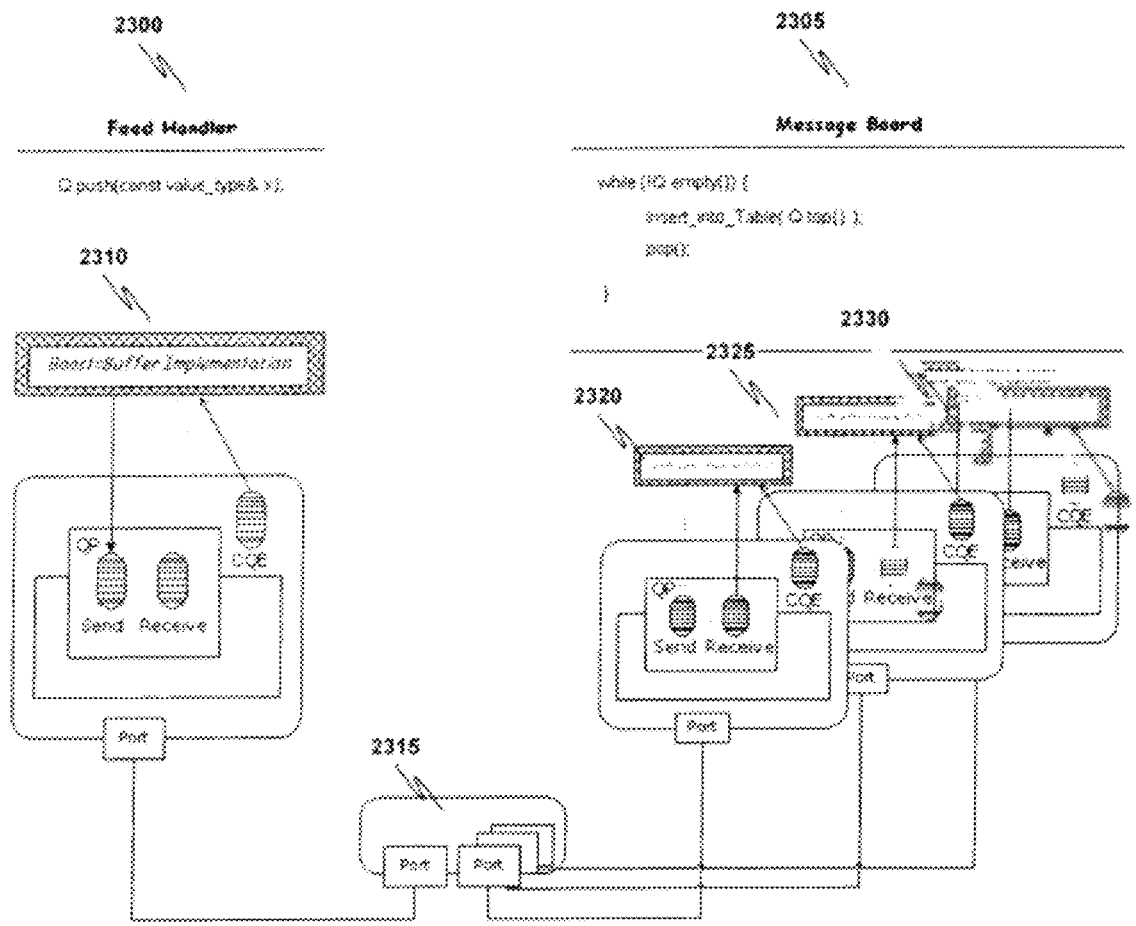
FIG. 23 is a block diagram that illustrates a feed handler and message board being deployed on an Infiniband fabric in accordance with one embodiment of the present invention.

FIG. 23 depicts a feed handler and message board being deployed on an Infiniband fabric in accordance with one embodiment of the present invention. Feed handler 2300 comprises a single host, while the message board 2305 is an MPI-based "Process Group." Each participating node (i.e. within the feed handler 2300 or message board 2305) has a local queue that is implemented (2310, 2320, 2325, 2330) using Boost's Buffer class template.

The feed handler pushes "Events" on to the queue as fast as they are received. Within a message board, an event is guaranteed to be processed by ONLY ONE node. This Distributed queue semantic is implemented using the parallel boost graph library (PBGL), or something that operates in a similar way.

Still referring to FIG. 23, two templated elements are (1) value type and (2) buffer type. The Value Type provides a global abstraction of the wire representation; facility benchmarks using a variety of encoding schemes (see section entitled "Wire Representation"). The Buffer Type provides an abstraction of the Cluster's interconnect; allowing for a variety of mediums to be used: Ethernet, RDMA/Ethernet, Infiniband, etc.

According to one embodiment of the present invention, one or more subscribers issue queries to a message board. These queries are replicated to a job queue at that is local to each node in the middle-tier. Each of these queries is treated like a parallel "Job;" serving to filter, transform, and enrich the data that traverses the channel. Nodes that make up this queue share a single, real-time clock, which is used to synchronize the sampling interval across the queue. When the clock ticks, it simultaneously pulses all nodes in the queue. Each queue then processes the "Jobs" in their job queue against the queued samples. This approach is based on reactive programming where the fundamental idea is that "computation takes zero time, and all transmissions take time 1. This means that messages are delivered between clock ticks, so no message reception can interrupt computation."

Figure 24:
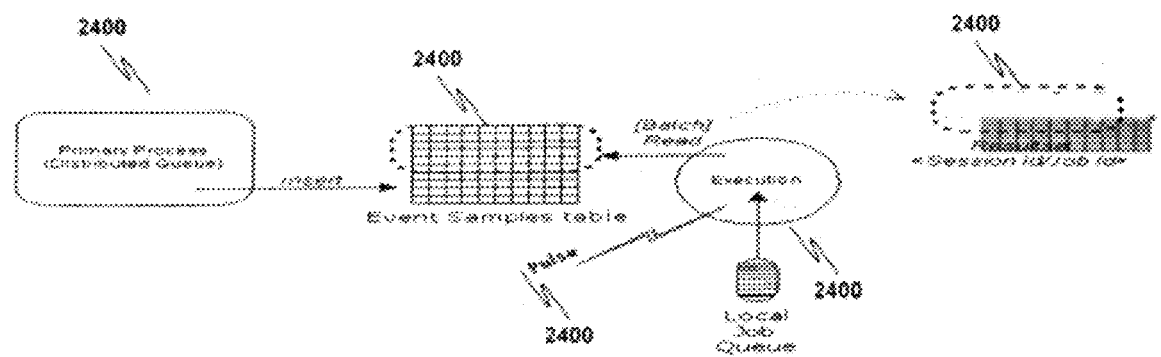
FIG. 24 is a block diagram that illustrates publish/subscribe communication accordance with one embodiment of the present invention.

As shown in FIG. 24, the architecture's Publish/Subscribe model uses several mechanisms: (1) Session, (2) Job, and (3) Results. According to one embodiment of the present invention, communication between a message board and a client application using its services is done using a session-oriented, single-request/many-responses message exchange pattern (aka publish/subscribe). In this context, the a establishes a session with the message board. If successful it is returned a "cookie" which can be used in subsequent requests. Once the session is established, the client then issues subscription requests. Upon successful registration of a subscription, the message board returns a cookie linked to the session cookie that will be used to associate any results back to the subscription.

```
Transaction #1 - Session Establishment
Client --> connect --> Message Board
Client <-- cookie <-- Message Board
Transaction #2 - Issuing a Subscription
Client --> subscribe(cookie,
subscription(data)) --> Message Board Client <--
cookie <-- Message Board
Transaction #3 - Receiving Continuous Results
Client <-- cookie/resultset <-- Message Board
Client <-- cookie/resultset <-- Message Board
Client <-- cookie/resultset <-- Message Board ...
Transaction #4 - Tearing
Client --> disconnect(cookie) --> Message Board
```

The Unix command-line, version of R runs a separate event loop for waiting for a response from a socket in the internal functions for direct socket access (see "rsock.c"). According to one embodiment of the present invention, this is modified to allow for support of the publish/subscribe communication protocol specified by a message board architecture. This is done by using the "libevent" asynchronous I/O library to replace the select-based, polling mechanism in the socket event loop. Instead, a callback is provided for each of several events. Of particular interest is the "read" event which is where data is dispatched to an R script for further processing.

In this context, a "Data Source" driver, similar to other available SQL packages is provided. This driver handles properly establishing the asynchronous event loop using the updated mechanism described above. A sample script snippet by which a developer may access the message board is presented below.

```
<snippet>
    con <- dbConnect(dbDriver("Streams"),
    dbname = "marketdata.ml.com")
    dbQuery(con, "select * from partition where symbol in {'MSFT',
    'INTC'}", &callback);
    Wait( );
    dbDisconnect(con);
</snippet>
```

After a Query is successfully registered with a message board, it begins to receive results via the callback method that was registered with the local socket event loop. Within this callback, results are queued to allow for workers to pull these in an efficient manner and prevent the consuming app from becoming overwhelmed by incoming data.

Figure 25:
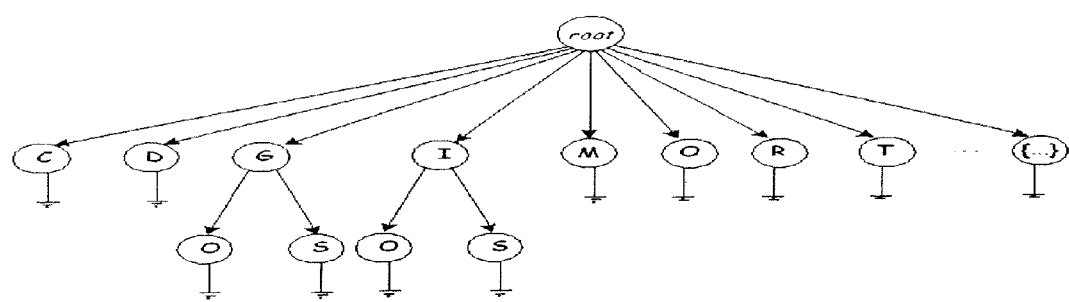
FIG. 25 is a block diagram that illustrates a high-level trie suitable for implementing aspects of the present invention.
Figure 26:
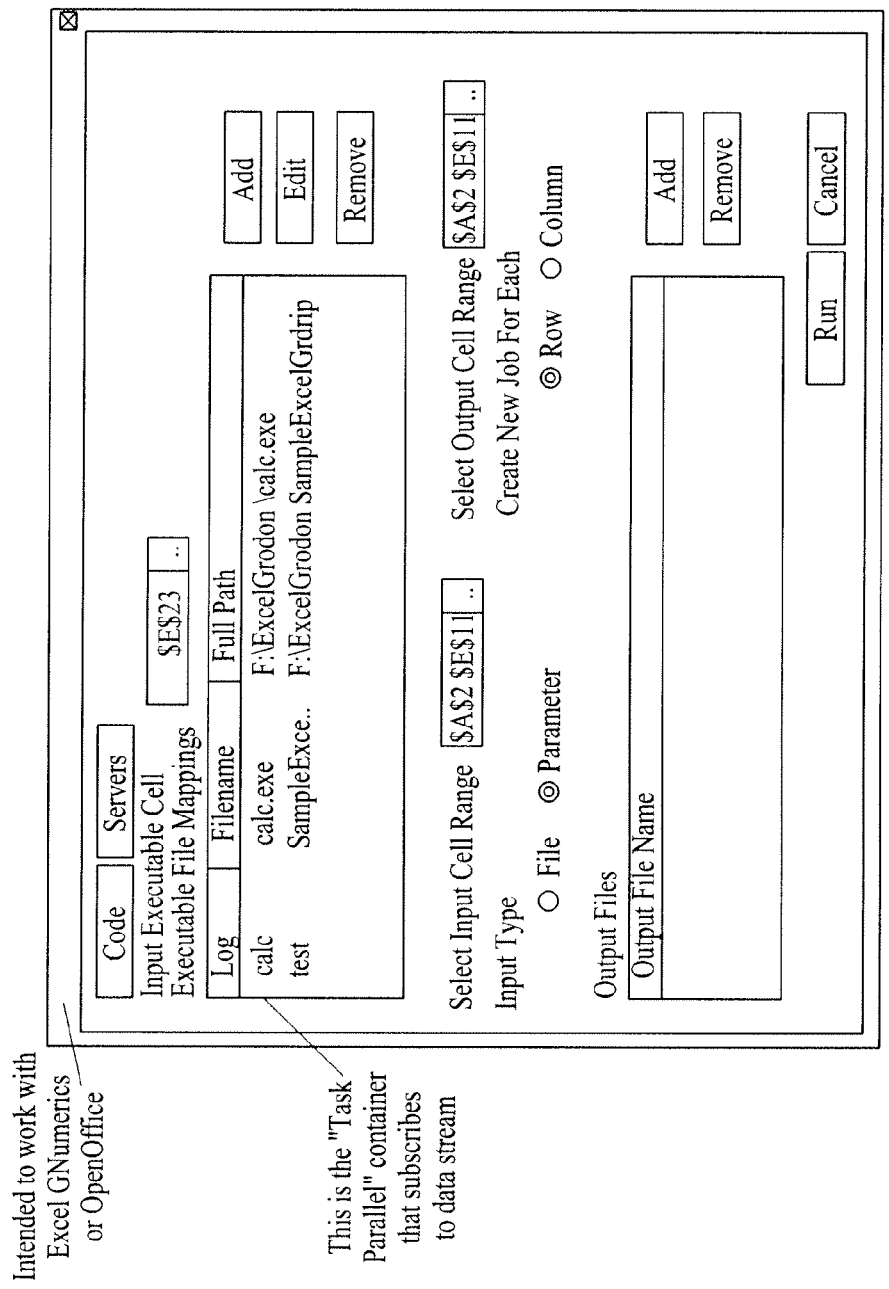
FIG. 26 is a screen shot of a user interface illustrating aspects of the present invention.

The general syntax of a "filter" derives from ANSI SQL:

Over a time series, Select * from <namespace> where symbol in {a, b, c, . . . (n)} with some deadline: d This filter can be viewed logically as a single "trie" data structure that serves as a [dynamic] routing table. A trie is a multi-way tree structure useful for storing strings over an alphabet. For example, given a "watch list" that consists of the following instruments:

{'CSCO', 'DJI', 'INTC', 'IXIC', 'GOOG', 'GSPC', 'MSFT', 'ORCL', 'RHAT', 'TNX'} a corresponding [but incomplete] trie is constructed as depicted in FIG. 25.

As data is put into the system it is run through this filter. Tasks that have an interest in these instruments are provided with the newly arrived data. Taking this a step further, an entity that registers interest in a particular set of instruments can attach an expression that further extends the processing. Here the resolution of the filter in layer two serves as the precondition/input to the expression. This input is then routed through a pipeline that transforms the data into a result that can be used directly by the subscriber.

This type of pipeline expression is illustrated by the synthesis of tinyDB and Ptolemy II. TinyDB is a query processing system for extracting data from motes, which are tiny sensors, through a declarative query interface that is similar to the SQL interface of a relational database system. Ptolemy II is a concurrent modeling and design tool. According to one embodiment of the present invention, a tool combines the capabilities of tinyDB and Ptolemy II; allowing the user to define input filters through a declarative query interface and then bind these to complex expressions. Internally, the filter and expression are compiled into a form that can be submitted to a message board.

According to one embodiment of the present invention, the solution is a mechanism for use by Traders, Money Managers, and Analysts to interact with the capital market(s) in real-time or near real-time. There are at least two types of applications that can use this mechanism: spreadsheets and high-performance, scale-out clusters.

The spreadsheet may be, by way of example, GNumerics, OpenOffice, MS Excel, or the like. In this embodiment of the present invention, the client application exploits the requisite R Statistical Package plug-in for the spreadsheet software to interact with the local R Statistical Package runtime environment. The user issues queries via the spreadsheet. These are then processed by the local R script and results returned to the spreadsheet as they are received. Alternatively, they are returned on a batching interval. This mechanism may be extended to allow for rich, interactive, 3-D graphics using a package such as RGL.

According to this embodiment of the present invention, the end user will be able to use the user interface to schedule a "Job," get periodic notifications of the job's progress, etc. The user will also be able to define and reserve their resource requirements in terms of the number of servers to be assigned to their query. A user interface illustrating this capability is shown in FIG.

The following are interfaces defined by MS Excel's Real-time Data Server (RDS). This is a delayed pull model, allowing the client to pull the data when it is ready. The Server provides a facility for batching up result sets on the client's behalf until they are ready for them.

```
interface IRtdServer
{
    void = ConnectData(TopicID, Strings, GetNewValues);
    void = DisconnectData(TopicID);
    long = Heartbeat( );
    resultset{x,y} = RefreshData(TopicCount);
    void = ServerStart(CallbackObject);
    void = ServerTerminate( );
    void = ThrottleInterval{long:get/set};
}
interface IRTDUpdateEvent
{
    HeartbeatInterval{long:get/set};
    void = Disconnect( );
    void = UpdateNotify( );
}
```

Figure 27:
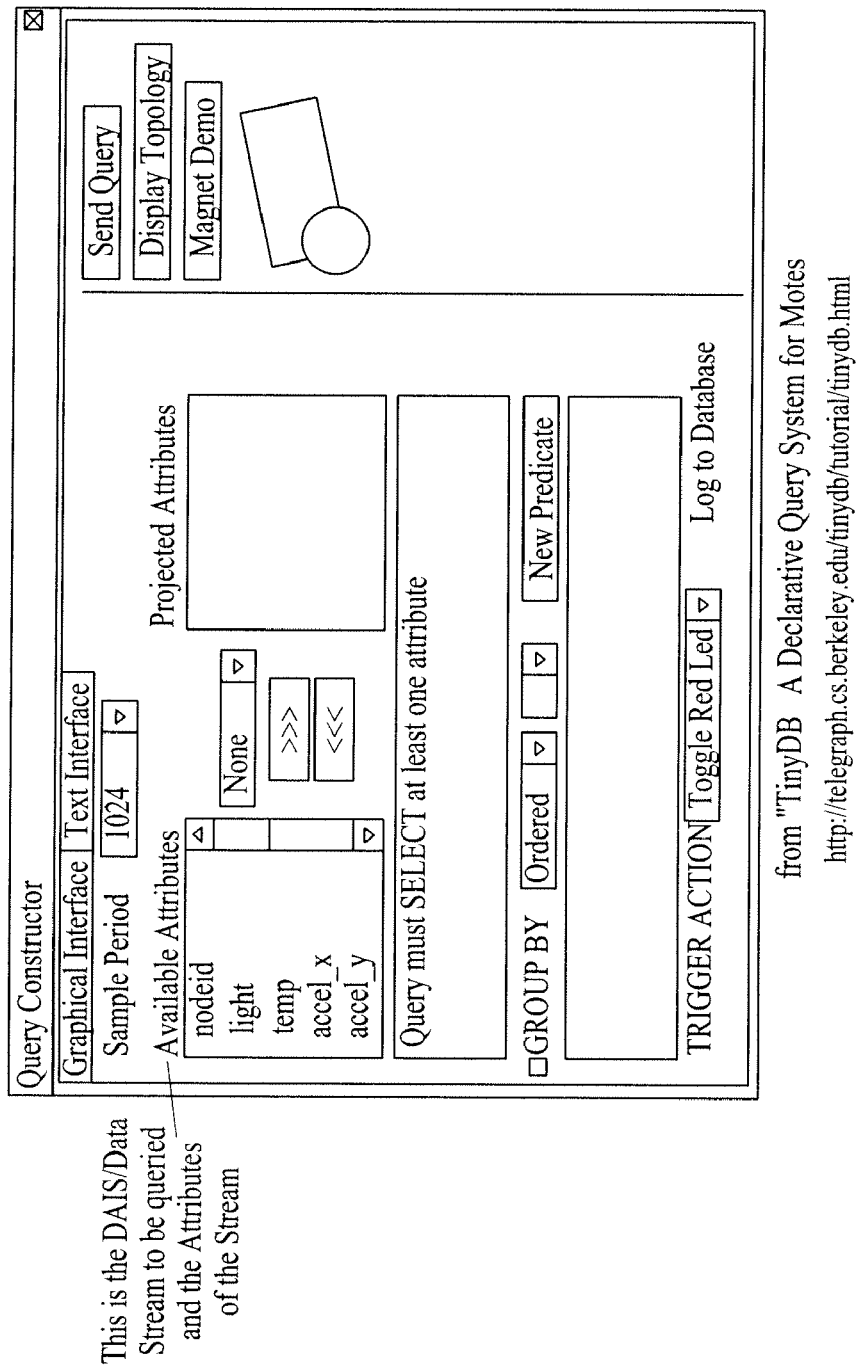
FIG. 27 is a screen shot of a user interface illustrating aspects of the present invention.

According to one embodiment of the present invention, the markets are represented as DAIS Streams under a Firm's root namespace. Each stream may have varying data layouts flowing through the channel. The tinyDB-like user interface abstracts these details away; allowing the user to define their queries in a consistent fashion. FIG. 27 illustrates such a user interface. This can be thought of a database Reporting tool.

The second style of application that may use this mechanism is a high performance, scale-out cluster, for example SNOW, RPVM, or the like. Here, a job is dispatched to the HPC cluster. The job may comprise a parallel execution job. From within this running job, an arbitrary task (i.e. thread of execution) can issue a query and begin receiving results. Further, many queries can be registered simultaneously. In addition, the job itself can be viewed as an implementation of a message board, allowing other clients to interact with it as it executed. One example of this is where the spreadsheet is used as a front-end to the job. The user interacts with the job via the spreadsheet's user interface (UI); initiating the job and then issuing a variety of queries to it during its execution. Results may be returned in tabular form to the spreadsheet with the additional option of displaying it graphically using the interactive, 3-D extension mentioned above.

According to one embodiment of the present invention, the embeddable "R" shell is used to create a remoting layer. Two capabilities are provided: (1) Issue a continuous query on a "data stream" and then (2) receive result sets over the asynchronous channel. A capability to unregister a query is also provided. The signature of the abstract base class may be, for example:

```
abstract class StreamQuery
{
    StreamQuery( );
    ~StreamQuery( );
    uuid RequestId = Query(fd Namspace, string SQL, callback&
Callback);
    int rc = StopQuery(fd Namspace, uuid RequestId);
    callback signature Callback(uuid RequestId, resultset );
}
```

The callback implementation dispatches a message in the "main loop" of the R shell. A user interface is not required. This mechanism receives asynchronous callbacks from a data source. An example of this can be used is as follows:

1. Assume there exists a namespace: "marketdata.ml.com"
2. Under this root are numerous real-time data streams (e.g. NASDAQ, SIAC, etc).

```
marketdata.ml.com/nasdaq
marketdata.ml.com/siac
. . .
```

3. Implement the abstract StreamQuery class using something similar to J2EE's JMS, specifically the JMS Publish/Subscribe model.
4. The implementation will be a Subscriber to the "marketdata.ml.com" namespace.
5. The implementation's Query method will treat the data stream as a "topic."
6. The implementation's Query method will treat the SQL string as a JMS "Filter."
7. The implementation's Callback method will serve to dispatch a Servlet request with no corresponding response.
8. Internally, the Callback dispatching implementation will dispatch an entry in the R main loop.
9. An associated R script will then be invoked that will have access to:
    {RequestId, Resultset}
10. These can then be operated on by the specific script.

The JMS/Servlet model is used as an example. The invention has broader scope and applies more generally high-throughput/low-latency, real-time data streams.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus for low latency data, the apparatus comprising:
    one or more feed handlers, each of the one or more feed handlers configured to:
    receive a stream of market data, the market data comprising a plurality of market data segments; and
    extract the plurality Of market data segments from the received stream of market data;
    one or more queues comprising one or more data partitions, the one or more queues coupled to the one or more feed handlers via a direct connection, the direct connection comprising a cluster interconnect of Beowulf style, the one or more queues configured to:
    receive the plurality of extracted market data segments from the one or more feed handlers;
    store each of the extracted market data segments in a particular one of the one or more data partitions based on a characteristic of each of the extracted market data segments; and
    filter the plurality of extracted market data segments stored in the one or more data partitions using one or more filters established by a particular one or more subscribers to create filtered data; and
    one or more publishers, each of the one or more publishers configured to: receive a portion of the filtered data;
    publish the portion of the filtered data for the particular one or more subscribers; and
    send, via a callback mechanism, a notification to the particular one or more subscribers when the one or more publishers receives the portion of the filtered data that was filtered by the filter established by the particular one or more subscribers;
    the one or more queues operable to filter the plurality of extracted market data segments stored in the one or more data partitions by creating a plurality of jobs and scheduling the plurality of jobs to be executed in parallel on one or more computer systems in a computational cluster; and
    wherein publishing the portion of the filtered data for the particular one or more subscribers comprises:
    determining whether the filtered data is associated with a shared subscription;
    publishing the filtered data to the particular one or more subscribers using an IP multicast channel if it is determined that the filtered data is associated with a shared subscription; and
    publishing the filtered data to the particular one or more subscribers using a point-to-point messaging transport if it is determined that the filtered data is not associated with a shared subscription.

2. The apparatus of claim 1 wherein the particular one or more subscribers comprises an IP multicast group.

3. The apparatus of claim 1 wherein the particular one or more subscribers comprises a plurality of subscribers.

4. The apparatus of claim 1 wherein the one or more queues and the one or more publishers comprise a plurality of independent processes coupled by an asynchronous communication mechanism.

5. The apparatus of claim 4 wherein each of the plurality of independent processes are assigned to a cluster partition.

6. The apparatus of claim 5 wherein the cluster partition is configured with cluster resources based at least in part on an advance reservation facility.

7. The apparatus of claim 1 wherein the feed handler is configured to receive one or more direct feeds from one or more markets.

8. The apparatus of claim 1 wherein the apparatus is further configured to maximize data parallelism using a farmer/worker programming pattern.

9. The apparatus of claim 1 wherein the apparatus is further configured to maximize data parallelism using a data parallelism programming pattern.

10. The apparatus of claim 1 wherein the apparatus is further configured to maximize data parallelism using a functional/task programming pattern.

11. The apparatus of claim 1 wherein the apparatus is further configured to provide value-added analytics.

12. The apparatus of claim 11 wherein the apparatus is further configured to provide the value-added analytics by:
applying a new algorithm to a metric calculation; and
making a resulting stream available to one or more subscribers.

13. The apparatus of claim 12 wherein the metric comprises VWAP (Volume Weighted Average Price).

14. The apparatus of claim 12 wherein the apparatus is further configured to receive one or more subscriptions from the one or more subscribers, the one or more subscriptions expressed as an SQL-like query.

15. The apparatus of claim 14 wherein the one or more subscriptions are issued as continuous data stream queries which provide an asynchronous callback method.

16. The apparatus of claim 1 wherein the one or more publishers are further configured to invoke a callback method provided by the particular one or more subscribers when the one or more publishers receives the portion of the filtered market that was filtered by the filter established by the particular one or more subscribers.

17. The apparatus of claim 15 wherein the asynchronous callback method is implemented using one or more of Linux Asynchronous I1O (AI0), .NET Delegate and J2EE Message-Driven Beans (MDB).

18. The apparatus of claim 15 wherein the apparatus is further configured to maximize data parallelism, the task parallelism implemented using one or more of C/C++ using Asynchronous I/O (AI0), .NET Delegate, and J2EE.

19. The apparatus of claim 1 wherein a StreamBase™ stream-processing engine comprises the one or more queues and the one or more publishers.

20. The apparatus of claim 14 wherein the apparatus is further configured to register the one or more subscriptions using a remote procedure call (RPC) mechanism that includes a partition identifier, the apparatus further configured to return a subscription ID for subsequent use in subscription management.

21. The apparatus of claim 1 wherein the apparatus resides at a root of a sensor network.

22. The apparatus of claim 1 wherein the apparatus is further configured to allocate costs to one or more consuming applications associated with the one or more subscribers, the allocation of costs being based at least in part on queries submitted by the one or more subscribers, and on the underlying resources consumed by the queries.

23. The apparatus of claim 1 wherein the one or more feed handlers, the one or more queues, and the one or more publishers share a single monotonic clock, the clock for use in synchronizing a sampling interval across the one or more queues.

24. A method for low latency data, the method comprising:
receiving a stream of market data, the market data comprising a plurality of market data segments;
extracting the plurality of market data segments from the received stream of market data;
receiving the plurality of extracted market data segments via one or more queues, the one or more queues comprising one or more data partitions, the plurality of extracted market data segments received via a direct connection, the direct connection comprising a cluster interconnect of Beowulf style;
storing each of the extracted market data segments in a particular one of the one or more data partitions based on a characteristic of each of the extracted market data segments;
filtering the plurality of extracted market data segments stored in the one or more data partitions using one or more filters established by a particular one or more subscribers to create filtered data, the filtering performed by creating a plurality of jobs and scheduling the plurality of jobs to be executed in parallel on one or more computer systems in a computational cluster;
receiving a portion of the filtered data; and
publishing the portion of the filtered data for the particular one or more subscribers, wherein publishing the portion of the filtered data for the particular one or more subscribers comprises:
determining whether the filtered data is associated with a shared subscription; publishing the filtered data to the particular one or more subscribers using an IP multicast channel if it is determined that the filtered data is associated with a shared subscription; and
publishing the filtered data to the particular one or more subscribers using a point-to-point messaging transport if it is determined that the filtered data is not associated with a shared subscription; and
sending, via a callback mechanism, a notification to the particular one or more subscribers when the portion of the filtered data that was filtered by the filter established by the particular one or more subscribers is received.

25. The method of claim 24 wherein the particular one or more subscribers comprises an IP multicast group.

26. The method of claim 24 wherein the particular one or more subscribers comprises a plurality of subscribers.

27. The method of claim 24 wherein the one or more queues and one or more publishers comprise a plurality of independent processes coupled by an asynchronous communication mechanism.

28. The method of claim 27 wherein each of the plurality of independent processes are assigned to a cluster partition.

29. The method of claim 28 wherein the cluster partition is configured with cluster resources based at least in part on an advance reservation facility.

30. The method of claim 24 wherein the feed handler is configured to receive one or more direct feeds from one or more markets.

31. The method of claim 24, further comprising maximizing data parallelism using a fanner/worker programming pattern.

32. The method of claim 24, further comprising maximizing data parallelism using a data parallelism programming pattern.

33. The method of claim 24, further comprising maximizing data parallelism using a functional/task programming pattern.

34. The method of claim 24, further comprising providing value-added analytics.

35. The method of claim 34, further comprising providing the value-added analytics by:
applying a new algorithm to a metric calculation; and
making the resulting stream available to one or more subscribers.

36. The method of claim 35 wherein the metric comprises VWAP (Volume Weighted Average Price).

37. The method of claim 35, further comprising receiving one or more subscriptions from the one or more subscribers, the one or more subscriptions expressed as an SQL-like query.

38. The method of claim 37, further comprising issuing the one or more subscriptions as continuous data stream queries which provide an asynchronous callback method.

39. The method of claim 24, further comprising invoking a callback method provided by the particular one or more subscribers when the one or more publishers receives the portion of the filtered market that was filtered by the filter established by the particular one or more subscribers.

40. The method of claim 38 wherein the asynchronous callback method is implemented using one or more of Linux Asynchronous 110 (A10), .NET Delegate and J2EE Message-Driven Beans (MDB).

41. The method of claim 38, further comprising maximizing data parallelism using one or more of C/C++ using Asynchronous I/O (A10), .NET Delegate, and J2EE.

42. The method of claim 24 wherein a StreamBase™ stream-processing engine comprises the one or more queues and the one or more publishers.

43. The method of claim 37, further comprising:
registering the one or more subscriptions using a remote procedure call (RPC) mechanism that includes a partition identifier; and
returning a subscription ID for subsequent use in subscription management.

44. The method of claim 24, further comprising allocating costs to one or more consuming applications associated with the one or more subscribers, the allocation of costs being based at least in part on queries submitted by the one or more subscribers, and on the underlying resources consumed by the queries.

45. A program storage device readable by a machine, embodying a program of instructions executable by the machine to perform a method for low latency data, the method comprising:
receiving a stream of market data, the market data comprising a plurality of market data segments;
extracting the plurality of market data segments from the received stream of market data;
receiving the plurality of extracted market data segments via one or more queues, the one or more queues comprising one or more data partitions, the plurality of extracted market data segments received via a direct connection, the direct connection comprising a cluster interconnect of Beowulf style;
storing each of the extracted market data segments in a particular one of the one or more data partitions based on a characteristic of each of the extracted market data segments;
filtering the plurality of extracted market data segments stored in the one or more data partitions using one or more filters established by a particular one or more subscribers to create filtered data, the filtering performed by creating a plurality of jobs and scheduling the plurality of jobs to be executed in parallel on one or more computer systems in a computational cluster;
receiving a portion of the filtered data; and
publishing the portion of the filtered data for the particular one or more subscribers, wherein publishing the portion of the filtered data for the particular one or more subscribers comprises:
determining whether the filtered data is associated with a shared subscription;
publishing the filtered data to the particular one or more subscribers using an IP multicast channel if it is determined that the filtered data is associated with a shared subscription; and
publishing the filtered data to the particular one or more subscribers using a point-to-point messaging transport if it is determined that the filtered data is not associated with a shared subscription; and
sending, via a callback mechanism, a notification to the particular one or more subscribers when the portion of the filtered data that was filtered by the filter established by the particular one or more subscribers is received.

46. The program storage device of claim 45 wherein the particular one or more subscribers comprises an IP multicast group.

47. The program storage device of claim 45 wherein the particular one or more subscribers comprises a plurality of subscribers.

48. The program storage device of claim 45 wherein the one or more queues and the one or more publishers comprise a plurality of independent processes coupled by an asynchronous communication mechanism.

49. The program storage device of claim 48 wherein each of the plurality of independent processes are assigned to a cluster partition.

50. The program storage device of claim 49 wherein the cluster partition is configured with cluster resources based at least in part on an advance reservation facility.

51. The program storage device of claim 45 wherein the feed handler is configured to receive one or more direct feeds from one or more markets.

52. The program storage device of claim 45, the method further comprising maximizing data parallelism using a farmer/worker programming pattern.

53. The program storage device of claim 45, the method further comprising maximizing data parallelism using a data parallelism programming pattern.

54. The program storage device of claim 45, the method further comprising maximizing data parallelism using a functional/task programming pattern.

55. The program storage device of claim 45, the method further comprising providing value-added analytics.

56. The program storage device of claim 55, the method further comprising providing the value-added analytics by:
applying a new algorithm to a metric calculation; and
making the resulting stream available to one or more subscribers.

57. The program storage device of claim 55 wherein the metric comprises VWAP (Volume Weighted Average Price).

58. The program storage device of claim 55, the method further comprising receiving one or more subscriptions from the one or more subscribers, the one or more subscriptions expressed as an SQL-like query.

59. The program storage device of claim 58, the method further comprising issuing the one or more subscriptions as continuous data stream queries which provide an asynchronous callback method.

60. The program storage device of claim 45, the method further comprising invoking a callback method provided by the particular one or more subscribers when the one or more publishers receives the portion of the filtered market that was filtered by the filter established by the particular one or more subscribers.

61. The program storage device of claim 59 wherein the asynchronous callback method is implemented using one or more of Linux Asynchronous 110 (A10), .NET Delegate and J2EE Message-Driven Beans (MDB).

62. The program storage device of claim 59, the method further comprising maximizing data parallelism using one or more of C/C++ using Asynchronous I/O (AI0), .NET Delegate, and J2EE.

63. The program storage device of claim 45 wherein a StreamBase™ stream-processing engine comprises the one or more queues and the one or more publishers.

64. The program storage device of claim 58, the method further comprising:
registering the one or more subscriptions using a remote procedure call (RPC) mechanism that includes a partition identifier; and
returning a subscription ID for subsequent use in subscription management.

65. The program storage device of claim 45, the method further comprising allocating costs to one or more consuming applications associated with the one or more subscribers, the allocation of costs being based at least in part on queries submitted by the one or more subscribers, and on the underlying resources consumed by the queries.

66. A method for low latency market data, the method comprising:
aggregating, by a first entity, one or more streams of market data, the market data comprising a plurality of market data segments;
storing, by the second entity, each of the market data segments in a particular one of one or more data partitions based on a characteristic of each of the extracted market data segments, the market data segments received via a direct connection, the direct connection comprising a cluster interconnect of Beowulf style;
filtering, by the second entity, the plurality of market data segments stored in the one or more data partitions using one or more filters established by a third entity, the filtering performed by creating a plurality of jobs and scheduling the plurality of jobs to be executed in parallel on one or more computer systems in a computational cluster;
registering, by a second entity, one or more queries regarding the one or more data streams;
publishing, by the second entity, one or more results for the one or more queries; and
subscribing, by the third entity, for receipt of at least one of the one or more results, wherein publishing one or more results for the one or more queries comprises:
determining whether the filtered data is associated with a shared subscription;
publishing the filtered data using an IP multicast channel if it is determined that the filtered data is associated with a shared subscription; and
publishing the filtered data using a point-to-point messaging transport if it is determined that the filtered data is not associated with a shared subscription; and
sending, via a callback mechanism, a notification to the third entity when the filtered data that was filtered by the filter established by the third entity is received.

67. An apparatus for low latency market data, the apparatus comprising:
a feed handler adapted to aggregate one or more streams of market data, the market data comprising a plurality of market data segments;
a message board coupled to the feed handler via a direct connection, the direct connection comprising a cluster interconnect of Beowulf style, the message board configured to:
store each of the market data segments in a particular one of one or more data partitions based on a characteristic of each of the extracted market data segments;
filter the plurality of market data segments stored in the one or more data partitions using one or more filters established by one or more subscribers, the filtering performed by creating a plurality of jobs and scheduling the plurality of jobs to be executed in parallel on one or more computer systems in a computational cluster;
register one or more queries regarding the one or more data streams;
publish one or more results for the one or more queries; and
send, via a callback mechanism, a notification to the one or more subscribers when the message board receives market data segments that were filtered by the one or more filters established by the one or more subscribers; and
one or more consumer applications configured to subscribe for receipt of at least one of the one or more results, wherein publishing one or more results for the one or more queries comprises:
determining whether the filtered data is associated with a shared subscription;
publishing the filtered data using an IP multicast channel if it is determined that the filtered data is associated with a shared subscription; and
publishing the filtered data using a point-to-point messaging transport if it is determined that the filtered data is not associated with a shared subscription.

68. The apparatus of claim 1, wherein storing each of the extracted market data segments in a particular one of the one or more data partitions based on a characteristic of each of the extracted market data segments comprises storing each of the extracted market data segments in a particular one of the one or more data partitions based on an exchange symbol in the market data segment.

69. The apparatus of claim 1, wherein the one or more filters comprise at least a time predicate.

70. The method of claim 24, wherein storing each of the extracted market data segments in a particular one of the one or more data partitions based on a characteristic of each of the extracted market data segments comprises storing each of the extracted market data segments in a particular one of the one or more data partitions based on an exchange symbol in the market data segment.

71. The method of claim 24, wherein the one or more filters comprise at least a time predicate.

72. The program storage device of claim 45, wherein storing each of the extracted market data segments in a particular one of the one or more data partitions based on a characteristic of each of the extracted market data segments comprises storing each of the extracted market data segments in a particular one of the one or more data partitions based on an exchange symbol in the market data segment.

73. The program storage device of claim 45, wherein the one or more filters comprise at least a time predicate.

* * * * *